United States Patent
Weber et al.

(10) Patent No.: US 11,325,124 B2
(45) Date of Patent: May 10, 2022

(54) APPARATUS FOR PATHOGEN DETECTION

(71) Applicant: FLUID-SCREEN, INC., Boston, MA (US)

(72) Inventors: Monika Weber, Wroclaw (PL); Siu Lung Lo, Mid-levels (HK); Hazael Fabrizio Montanaro Ochoa, Asuncion (PY); Christopher Daniel Yerino, New Haven, CT (US); Mark A. Reed, Monroe, CT (US)

(73) Assignee: Fluid-Screen, Inc., Boston, MA (US)

( * ) Notice: Subject to any disclaimer, the term of this patent is extended or adjusted under 35 U.S.C. 154(b) by 0 days.

(21) Appl. No.: 16/728,824

(22) Filed: Dec. 27, 2019

(65) Prior Publication Data

US 2020/0129980 A1 Apr. 30, 2020

Related U.S. Application Data

(63) Continuation of application No. 14/582,525, filed on Dec. 24, 2014, now Pat. No. 11,198,126, which is a
(Continued)

(51) Int. Cl.
*B01L 3/00* (2006.01)
*B03C 5/00* (2006.01)
(Continued)

(52) U.S. Cl.
CPC ........ *B01L 3/502753* (2013.01); *B03C 5/005* (2013.01); *B03C 5/024* (2013.01);
(Continued)

(58) Field of Classification Search
CPC ............................ B01L 3/502753; B01L 5/005
See application file for complete search history.

(56) References Cited

U.S. PATENT DOCUMENTS

| 5,622,588 A | 4/1997 | Weber |
| 5,814,200 A | 9/1998 | Pethig et al. |

(Continued)

OTHER PUBLICATIONS

Markx, G., Huang, Y., Zhou, X.F., Pethig, R., "Dielectrophoretic Characterization and Separation of Micro-Organisms, Microbiology" 140, 585-591, (1994).
(Continued)

*Primary Examiner* — Luan V Van
*Assistant Examiner* — Caitlyn Mingyun Sun
(74) *Attorney, Agent, or Firm* — DeLio Peterson & Curcio LLC; Robert Curcio

(57) ABSTRACT

An apparatus for separating an analyte from a test sample, such as bacteria from blood components, based on their dielectric properties, localizing or condensing the analyte, flushing substantially all remaining waste products from the test sample, and detecting low concentrations of the analyte. The module array includes a plurality of microfluidic channels with connecting microfluidic waste channels for directing undesired material away from the analyte. An electric field is applied causing a positive dielectrophoretic force to the analyte to capture the analyte. The electric field is applied to at least one electrode having a plurality of concentric rings or concentric arcs extending radially outwards from a center point, electrically connected to a voltage source such that when voltage is applied to the at least one electrode, the concentric rings or concentric arcs alternate in voltage potential.

16 Claims, 21 Drawing Sheets

Related U.S. Application Data continuation-in-part of application No. 13/664,967, filed on Oct. 31, 2012, now Pat. No. 9,120,105.

(60) Provisional application No. 61/557,654, filed on Nov. 9, 2011, provisional application No. 61/553,413, filed on Oct. 31, 2011.

(51) Int. Cl.
*B03C 5/02* (2006.01)
*G01N 27/414* (2006.01)

(52) U.S. Cl.
CPC .............. B01L 2300/0874 (2013.01); B01L 2400/0406 (2013.01); B01L 2400/0424 (2013.01); B01L 2400/0487 (2013.01); B03C 2201/18 (2013.01); B03C 2201/26 (2013.01); G01N 27/4145 (2013.01)

(56) References Cited

U.S. PATENT DOCUMENTS

| | | | |
|---|---|---|---|
| 6,071,394 | A | 6/2000 | Cheng et al. |
| 6,149,789 | A | 11/2000 | Benecke et al. |
| 6,280,590 | B1 | 8/2001 | Cheng et al. |
| 6,294,063 | B1 * | 9/2001 | Becker ............... B01F 13/0076 204/450 |
| 6,537,433 | B1 * | 3/2003 | Bryning ............ B01L 3/502761 204/450 |
| 6,576,459 | B2 | 6/2003 | Miles et al. |
| 6,875,329 | B2 | 4/2005 | Washizu et al. |
| 6,887,362 | B2 | 5/2005 | Huang et al. |
| 6,989,086 | B2 | 1/2006 | Cheng et al. |
| 7,081,192 | B1 | 7/2006 | Wang et al. |
| 7,153,648 | B2 | 12/2006 | Jing et al. |
| 7,169,282 | B2 | 1/2007 | Talary et al. |
| 7,198,702 | B1 | 4/2007 | Washizu et al. |
| 7,384,791 | B2 | 6/2008 | Tyvoll et al. |
| 7,390,387 | B2 | 6/2008 | Childers |
| 7,390,388 | B2 | 6/2008 | Childers |
| 7,470,533 | B2 * | 12/2008 | Xu ......................... C12M 23/12 435/285.2 |
| 7,534,334 | B1 | 5/2009 | Fiechtner |
| 7,615,762 | B2 | 11/2009 | Satyanarayana |
| 7,658,829 | B2 | 2/2010 | Kanagasabapathi et al. |
| 7,666,289 | B2 | 2/2010 | Simmons |
| 7,686,934 | B2 | 3/2010 | Hodko et al. |
| 7,744,738 | B1 | 6/2010 | Gagnon et al. |
| 7,915,030 | B2 * | 3/2011 | Inoue ............... B01L 3/502784 435/287.2 |
| 2004/0109793 | A1 | 6/2004 | McNeely |
| 2004/0226819 | A1 | 11/2004 | Talary et al. |
| 2005/0221333 | A1 * | 10/2005 | Sundararajan ....... C12Q 1/6869 435/6.19 |
| 2008/0302664 | A1 | 12/2008 | Liu et al. |
| 2009/0294291 | A1 | 12/2009 | Voldman et al. |
| 2009/0304644 | A1 * | 12/2009 | Hedrick ............... C12N 5/0667 424/93.7 |
| 2010/0140110 | A1 * | 6/2010 | Kim .................... H01L 29/0665 205/775 |
| 2010/0285606 | A1 * | 11/2010 | Phillips ............ B01L 3/502761 436/501 |
| 2010/0305499 | A1 * | 12/2010 | Matsiev ............... A61B 5/4839 604/67 |
| 2011/0147917 | A1 | 6/2011 | England |
| 2012/0031759 | A1 * | 2/2012 | Hausmann ............. B03C 5/026 204/547 |
| 2013/0105317 | A1 | 5/2013 | Weber et al. |

OTHER PUBLICATIONS

Vahey, M.D., Voldman, J., "High-Throughput Cell and Particle Characterization Using Isodielectric Separation", Anal. Chemistry, 2009, 81 (7), 2446-2455.

Kuczenski, R., Chang, H., Revzin, A., "Dielectrophoretic Microfluidic Device for the Continuous Sorting of *Escherichia coli* From Blood Cells", Biomicrofluidics, 5, 032005, (2011).

Stern, E., Steenblock, E.R., Reed, M.A., Fahmy, T.M., "Label-Free Electronic Detection of the Antigen-Specific T-Cell Immune Response", Nano Lett. 8, 3310 (2008).

Vacic, A, Criscione, J.M., Stern, E., Rajan, N.K., Fahmy, T.M., Reed, M.A., "Multiplexed Soi Biofets", Biosens. Bioelectron., 28, 239-242 (2011).

Beving , H., Eriksson, L.E.G., Davey, C.L., Kell, D.B., "Dielectric Properties Of Human Blood And Erythrocytes At Radio Frequencies (0.2-10 Mhz); Dependence On Cell Volume Fraction and Medium Composition", Eur Biophys J., 23, 207-215 (1994).

Yang, J., Huang, Y., Wang, X., Becker, F., Gascoyne, P., "Differential Analysis Of Human Leukocytes By Dielectrophoretic Field-Flow-Fractionation", Biophysical Journal, 78, 2680-2689, (2000).

Yang, J., Huang, Y., Wang, X., Becker, F., Gascoyne, P., "Dielectric Properties of Human Leukocyte Subpopulations Determined By Electrorotation as a Cell Separation Criterion", Biophysical Journal, 76, 3307-3314, (1999).

Pethig, R., Review Article—Dielectrophoresis: Status of the Theory, Technology, and Applications, Biomicrofluidics, 022811, (2010).

Pohl, H., Hawk, I., "Separation Of Living And Dead Cells By Dielectrophoresis", Science, 152, 3722 (1968).

Huang, Y., Holzel, R., Pethig, R., Wang, X., "Differences In The Ac Electrodynamics Of Viable And Non-Viable Yeast Cells Determined Through Combined Dielectrophoresis And Electrorotation Studies", Phys. Med. Bid., 37,7, (1992).

Chang, S., Cho, Y., "A Continuous Size-Dependent Particle Separator Using A Negative Dielectrophoretic Virtual Pillar Array", Lab Chip, 8, 1930-1936, (2008).

Choi, Jae-Woo, Rosset, S., Niklaus, M., Adleman, J.R., Shea, H., Psaltis, D., "3-Dimensional Electrode Patterning Within A Microfluidic Channel Using Metal ION Implantation", Lab On A Chip, vol. 10, Issue: 6, pp. 783-788, (2010).

Stern, E., Vacic, A., Rajan, N.K., Criscione, J.M., Park, J., Ilic, B.J., Mooney, D.J., Reed, M.A., Fahmy, T.M., "Label-free biomarker detection from whole blood", Nature Nanotechnology 5, 138-142 (2010).

Sher, L., "Dielectrophoresis in Lossy Dielectric Media", Nature 220, 695-696, 1968.

Voldman, J., "Electrical Forces For Microscale Cell Manipulation", Annual Review Of Biomedical Engineering, vol. 8: 425-454, (2006).

Cheng, I.F.; Chang, H.C.; Hou, D.; Chang, H.C.; "An Integrated Dielectrophoretic Chip For Continuous Bioparticle Filtering, Focusing, Sorting, Trapping, And Detecting, Biomicrofluidics" 1, 021503 (2007).

Unni, H.N., Hartono, D., Yue, L., Yung, L., Ng, M., Lee, H. P., Khoo, B.C., Lim, K.M, "Characterization And Separation Of Cryptosporidium And Giardia Cells Using On-Chip Dielectrophoresis", Biomicrofluidics 6, 012805 (2012).

Fritz, G. Jr., "Anomalous Diffusion Of Erythrocytes In The Presence Of Polyvinylpyrrolidone", Biophys. J. vol. 46 Aug. 1984 219-228, (1984).

Cho, S.K, Hyejin, M., Kim, C.J., "Creating, Transporting, Cutting, and Merging Liquid Droplets by Electrowetting-Based Actuation for Digital Microfluidic Circuits", J Mems, 12 70, (2003).

Surowiect, A., Stuchly, S., Izaguirre, C., "Dielectric Properties Of Human B And T Lymphocytes At Frequencies From 20 Khz To 100 Mhz", Phys. Med. Biol., 31, 1 (1986).

Cociancich, S., Ghazi, A., Hetru, C., Hoffmann, J., Letelliers, L., "Insect Defensin, An Inducible Antibacterial Peptide, Forms Voltage-Dependent Channels In Micrococcus Luteus" Journal Of Biological Chemistry, vol. 268 Iss:26 p. 19239-45, (1993).

Printen, J.A., Woodard, S.L., Herman, J.R., Roess D.A., Barisas, B.G., "Membrane Changes In Lipopolysaccharide-Stimulated Murine B-Lymphocytes Associated With Cell Activation", Biochimica Et Biophysica Acta, 1148 91-96, (1993).

Carstensen, E.L., "Passive Electrical Properties Of Microorganisms", Biophysical Journal, vol. 7, (1967).

(56) References Cited

OTHER PUBLICATIONS

Shah, G.J., Veale, J.L., Korin, Y., Reed, E.F., Gritsch H.A., "Specific binding and magnetic concentration of CD8+ T-lymphocytes on electrowetting-on-dielectric platform", Biomicrofluidics 4, 044106 (2010).

Lee, J., Moon, H., Fowler, J., Schoellhammer, T., Kim, C.J., "Electrowetting and Electrowetting-On-Dielectric for Microscale Liquid Handling" Sensors And Actuators A. 95 259 (2002).

Pollack, M.G., Shenderov, A.D., Fair, R.B., "Electrowetting-Bsed Actuation of Droplets for Integrated Microfluidics" Lab Chip 2 96 (2002).

Pollack, M.B., Fair, R.B., Shenderov, A.D., "Electrowetting-Based Actuation of Liquid Droplets for Microfluidic Applications", Appl. Phys. Lett 11 1725 (2000).

Pohl, H.A.; Kaler, Karan; Pollock, Kent; "The Continuous Positive and Negative Dielectrophoresis of Microorganisms", Forum Press, Inc., 67-86 (1981).

\* cited by examiner

TABLE I

|  | real ε | imag ε | σ [S/m] | radius r[um] | serum at 10MHz α*1e-24 | real CM |
|---|---|---|---|---|---|---|
| Ecoli | 180 | 324 | 0.18 | 1.6 | -0.0044 | -0.2575 |
| Micrococcus | 300 | 540 | 0.3 | 1.7 | -0.0027 | -0.1308 |
| T lymphocyte | 100 | 540 | 0.3 | 3.3 | 0.0136 | 0.0906 |
| Monocytes | 127 | 1008 | 0.56 | 4.6 | 0.0161 | 0.0396 |
| B-lymphocyte | 154 | 1313 | 0.73 | 3.3 | 0.0201 | 0.1338 |
| Granulocyte | 151 | 1080 | 0.6 | 4.7 | 0.0278 | 0.0642 |
| RBC | 500 | 1709 | 0.95 | 3.5 | 0.0437 | 0.2445 |

FIG. 8

|  | PBS @ 10 MHz | | serum @ 400MHz | |
| --- | --- | --- | --- | --- |
|  | $\alpha*1e-24$ | real CM | $\alpha*1e-24$ | real CM |
| Ecoli | 0.0055 | 0.3005 | 0.0044 | 0.2681 |
| Micrococcus | 0.0106 | 0.4853 | 0.0043 | 0.2305 |

FIG. 10

APPARATUS FOR PATHOGEN DETECTION

BACKGROUND OF THE INVENTION

1. Field of the Invention

The invention relates to an apparatus for pathogen detection. Specifically, the invention relates to the field of pathogen detection systems and diagnostic devices and their micro-component assembly. More specifically, the invention utilizes an apparatus that includes a dielectrophoretic separator, a dielectrophoretic condenser, a dielectrophoretic trap, microfluidic components, and field effect sensor, such as an ion sensitive sensor, nanowire sensor, or nanoribbon sensor configured as biosensors, to perform a pathogen detection process. The invention further relates to a specific electrode design for high yield pathogen and cell capture and separation.

2. Description of Related Art

Bacterial infections cause thousands of diseases in humans and animals every year. Recent deadly outbreaks of *E. coli, Salmonella*, and *Listeria* have highlighted the urgent need for more effective methods of detection, identification, and characterization of pathogens, and their origin and proliferation. Conventional detection methods have proven inadequate because they suffer from long incubation periods, high cost, and require highly trained personnel to operate. There remains a strong need for a reliable, time-efficient apparatus and method for specific detection of bacteria in low concentration.

Conventional methods rely on bacterial culture growth, which require highly qualified personnel and time, both contributing to higher costs for the procedure. The most widely used method for bacterial detection, the standard plate count, takes from 24 to 48 hours due to the time needed for bacteria to grow detectable colonies, and requires a stocked microbiology lab. Although faster methods, such as PCR (Polymerase Chain Reaction) Plates or labeled detection and fluorescent imaging, can reduce the response time to one hour, these require complex sample preparation, highly trained personnel, high cost per test, and have limited portability.

The major challenge in automated sample preparation for detection from blood or other unprocessed liquids using microstructures is efficient separation of the analyte of interest (bacteria, cells, or particles) from large blood components. Red blood cells (RBC) and white blood cells (WBC) range between 6 μm-21 μm in size and constitute over 50% of the whole blood volume. RBC and WBC presence obstructs the detection of bacteria, cells, or particles. The present invention is a miniaturized device for rapid pathogen screening that overcomes these obstacles.

Dielectrophoresis ("DEP") is a separation method based on size and dielectric properties and has been described in literature as for example in Pohl et al, Science 1966, and Sher Nature 1968, Voldman, Annual Review Of Biomedical Engineering, 2006. The use of DEP to manipulate particles and cells has been previously described, as for example, in H. Pohl, I. Hawk, "*Separation Of Living And Dead Cells By Dielectrophoresis*," Science, 152, 3722 (1966); Y. Huang, R. Holzel, R. Pethig, X. Wang, "*Differences In The Ac Electrodynamics Of Viable And Non-Viable Yeast Cells Determined Through Combined Dielectrophoresis And Electrorotation Studies*," Phys. Med. Bid., 37, 7 (1992); S. Chang, Y. Cho, "*A Continuous Size-Dependent Particle Separator Using A Negative Dielectrophoretic Virtual Pillar Array*," Lab Chip, 8, 1930-1936 (2008); and J. Yang, Y. Huang, X. Wang, F. Becker, P. Gascoyne, "Differential Analysis Of Human Leukocytes By Dielectrophoretic Field-Flow-Fractionation," Biophysical Journal, 78, 2680-2689 (2000). However, effective methods for cell/pathogen separation on a micro-scale from fluids containing pollutants of comparable size are still unattainable.

High-frequency electric fields when applied to an electrically neutral object cause polarization. A high-frequency non-uniform electric field gives rise to a dielectrophoretic force (DEP) $F_{DEP}$ which acts on the object.

A spherical object of a given electrical permittivity $\in_p$ placed in a medium of a different permittivity $\in_m$ in a spatially varying electric field $E(x,\omega)$ is subjected to a dielectrophoretic force, $F_{DEP}$. The dielectrophoretic force is given by:

$$F_{DEP} = 2\pi \in_m r^3 Re\{CM(\omega)\} \cdot \nabla E^2$$

where $CM(\omega)$ is the Clausius-Mossotti factor = $(\in_p^\sim - \in_m^\sim)/(\in_p^\sim + 2\in_m^\sim)$ $\in^\sim = \in + \sigma/i\omega$;

$Re\{CM(\omega)\}$ is the real part of the $CM(\omega)$, which can be a complex number;

$\in_p$ is the particle permittivity;

$\in_m$ is the permittivity of the liquid medium;

r is the particle radius;

$\in^\sim$ is the complex permittivity (complex dielectric function);

σ is the conductivity;

ω is the angular frequency; and $\nabla E$ is the gradient of the electric field.

Depending on the respective permeability ($\in^\sim$) and conductivity (σ) of the object and the medium, the force can be attractive (positive dielectrophoresis (pDEP)), or repulsive (negative dielectrophoresis (nDEP)). If $Re\{CM(\omega)\}$ is positive, then the particle experiences a positive dielectrophoretic force, and if $Re\{CM(\omega)\}$ is negative, then the particle experiences a negative dielectrophoretic force. Different species have different dielectric properties. The dielectric functions $\in_m$, $\in_p$ depend on the frequency of the external electric field. The permittivity of the medium affects the $CM(\omega)$ factor and the value of $Re\{CM(\omega)\}$. Importantly, if the signs of $Re\{CM(\omega)\}$ for different species are opposite then the species are subject to forces acting in opposite directions and separation occurs.

There is a cross-over frequency, $\omega_{co}$, that occurs when the $Re\{CM(\omega)\}$ goes to zero. Critical to separation is that $\omega_{co}$ is uniquely different for different cells and bacteria. Separation procedures for stained cells have been described in U.S. Pat. No. 7,153,648 entitled "Dielectrophoretic Separation Of Stained Cells," where appropriate frequency and amplitude are applied via a function generator, and red blood cells are attracted to electrodes by positive dielectrophoresis force, while stained white blood cells are repelled to the area with weakest electric field by negative dielectrophoresis force. The differential behavior and separation of *E. coli* cells from human blood cells on electrodes under applied electric field has been described in patent U.S. Pat. No. 6,989,086 entitled "Channel-less separation of bioparticles on an Electronic Chip by Dielectrophoresis."

The dielectrophoretic force is affected both by the geometry of the electrodes (gradient of the electric field), the $Re\{CM(\omega)\}$ factor, and depends on the dielectric constant of the medium $\in_m$.

Using the aforementioned prior art techniques for dielectrophoresis, the separation of bacteria from blood may achieve, at best, an efficiency of approximately 30%.

SUMMARY OF THE INVENTION

Bearing in mind the problems and deficiencies of the prior art, it is therefore an object of the present invention to provide a filtration system for pathogen detection that utilizes a plurality of dielectrophoretic modules with distinctive functionality and geometry to obtain separation performance which cannot be obtained using the single module apparatus of the prior art.

It is another object of the present invention to provide a pathogen detection system that includes a capture/release mechanism for solution exchange without cell loss to enhance pathogen detection at low concentrations.

It is yet another object of the present invention to provide a method for separating a low concentration of bacteria (or other pathogens/particles) from a high volume of blood (or other fluids) which is based on the dielectric properties of the products. The species separation being enhanced and promoted by dielectrophoretic forces acting on the test sample in a plurality of microfluidic channels.

It is another aspect of the present invention to provide a filtration system for pathogen detection that can accommodate high and low throughput, capable of processing test sample volumes significantly greater than micro- or picoliters, yet capable of processing the minute test sample volumes as well.

It is yet another object of the present invention to provide an electrode design that can perform high yield pathogen and cell capture, and enhance separation.

It is another object of the present invention to provide pathogen detection in liquid media, especially for use with food and agricultural products to improve health standards at the consumer level.

It is another object of the present invention to provide time sensitive pathogen detection for point-of-care diagnostics.

Still other objects and advantages of the invention will in part be obvious and will in part be apparent from the specification.

The above and other objects, which will be apparent to those skilled in the art, are achieved in the present invention which is directed to an apparatus for pathogen detection comprising: a first chamber for storing a test sample including product to be analyzed and microscaled components to be separated from said product to be analyzed; a second chamber for storing a reference solution; a pump for pumping said test sample and said reference solution; a microfluidic separator separating said product to be analyzed from said microscaled components, said microfluidic separator including a plurality of microfluidic channels, each microfluidic channel including: at least one electrode for producing a dielectrophoretic force on said test sample when said test sample is pumped through said microfluidic channel to perform a dielectrophoresis-based separation, said at least one electrode comprising: a plurality of concentric rings or concentric arcs extending radially outwards from a center point, electrically connected to a voltage source such that when voltage is applied to said at least one electrode, said concentric rings or concentric arcs alternate in voltage potential, wherein each odd numbered ring or arc counted from said center point is held to a first voltage potential, and each even numbered ring or arc is held to a second voltage potential, said first voltage potential different from said second voltage potential in magnitude, phase, polarity, or any combination thereof; and channels for transporting said microscaled components away from said product to be analyzed.

The apparatus further includes a third chamber for storing said microscaled components when separated from said product to be analyzed by said plurality of microfluidic channels; a condenser for capturing said product to be analyzed once said product has passed through said microfluidic channels and is substantially separated from said microscaled components; and a sensor for detecting said product to be analyzed.

The plurality of microfluidic channels may be assembled in an array, each microfluidic channel having at least one electrode on an internal wall for delivering the dielectrophoretic force to the test sample traversing through the microfluidic channel.

The microfluidic channels preferably comprise a plurality of plates, such that each microfluidic channel represents an elongated pathway for the test sample capable of providing a dielectrophoretic force or force arising from AC electric field in fluids to the test sample as the test sample traverses the microfluidic channel.

A collecting electrode is used to attract the product to be analyzed at an inlet of the sensor. The sensor includes a field effect based sensor, nanowire sensor, nanoribbon sensor, or ion sensitive field effect transistor, and is capable of applying a confining dielectrophoretic force, trapping the product to be analyzed.

The pump may be a micro-pump operating in tandem with micro-valves to achieve a fully automated pathogen detection filtration system capable of miniaturization to a chip-scale design.

The apparatus may also include a microfluidic transport module for transporting the product to be analyzed to a location in the vicinity of the sensor.

The electrode design may include even numbered concentric rings or arcs in electrical communication with one another, and odd numbered concentric rings or arcs are in electrical communication with one another.

In a second aspect, the present invention is directed to an apparatus for pathogen detection comprising: a microfluidic assembly including a plurality of microfluidic channels forming an array, each of said microfluidic channels including: at least one electrode for establishing dielectrophoretic forces on a test sample separating portions of said test sample into an analyte and a waste product, said at least one electrode comprising a plurality of concentric rings or concentric arcs extending radially outwards from a center point, electrically connected to a voltage source such that when voltage is applied to said at least one electrode, said concentric rings or concentric arcs alternate in voltage potential, wherein each odd numbered ring or arc counted from said center point is held to a first voltage potential, and each even numbered ring or arc is held to a second voltage potential, said first voltage potential different from said second voltage potential in magnitude, phase, polarity, or any combination thereof; adjacent microchannels for receiving said waste product attracted by a dielectrophoretic force, removing said waste product from said analyte; a condenser including an electrode for localizing said analyte for sensing; and a sensor for detecting said analyte.

A pharmaceutical or other substance may be introduced which pierces membranes of an alive analyte component in the reference solution at a predetermined frequency, but not membranes of other analyte components or dead analyte components, and differentiating the alive component from other analyte components and dead analyte components through dielectrophoretic forces.

The pH or conductivity of the test sample may be adjusted for control of voltage and frequency dependence for the Clausius-Mossotti factor cross-over frequency.

Change of the Clausius-Mossotti factor cross-over frequency may be induced for the analyte by adding or mixing an additional fluid.

The step of detecting low amounts of analyte using a microfluidic sensor includes using an electric field at predetermined flow conditions, to immobilize the analyte on the surface of a field effect based sensor, nanowire sensor, nanoribbon sensor, or ion sensitive field effect transistor sensor.

Super positioning or tuning of frequency components, waveform shapes, and waveform tunings, or any combination thereof, may be performed to maximize separation, differentiation, capture, or release of the analyte.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 depicts a table (Table I) providing values of the coefficient α for RBC, WBC, and bacteria at 10 MHz in blood serum;

FIG. 10 depicts a table (Table II) providing values for the real and imaginary permeability as well as the particle radius and conductivity of *E. coli* and *Micrococcus* in a reference solution and blood serum;

FIG. 22 depicts the microchannel containing contaminated fluid of FIG. 22 with the electrode's electric field ON;

DESCRIPTION OF THE PREFERRED EMBODIMENT(S)

Figure 1:
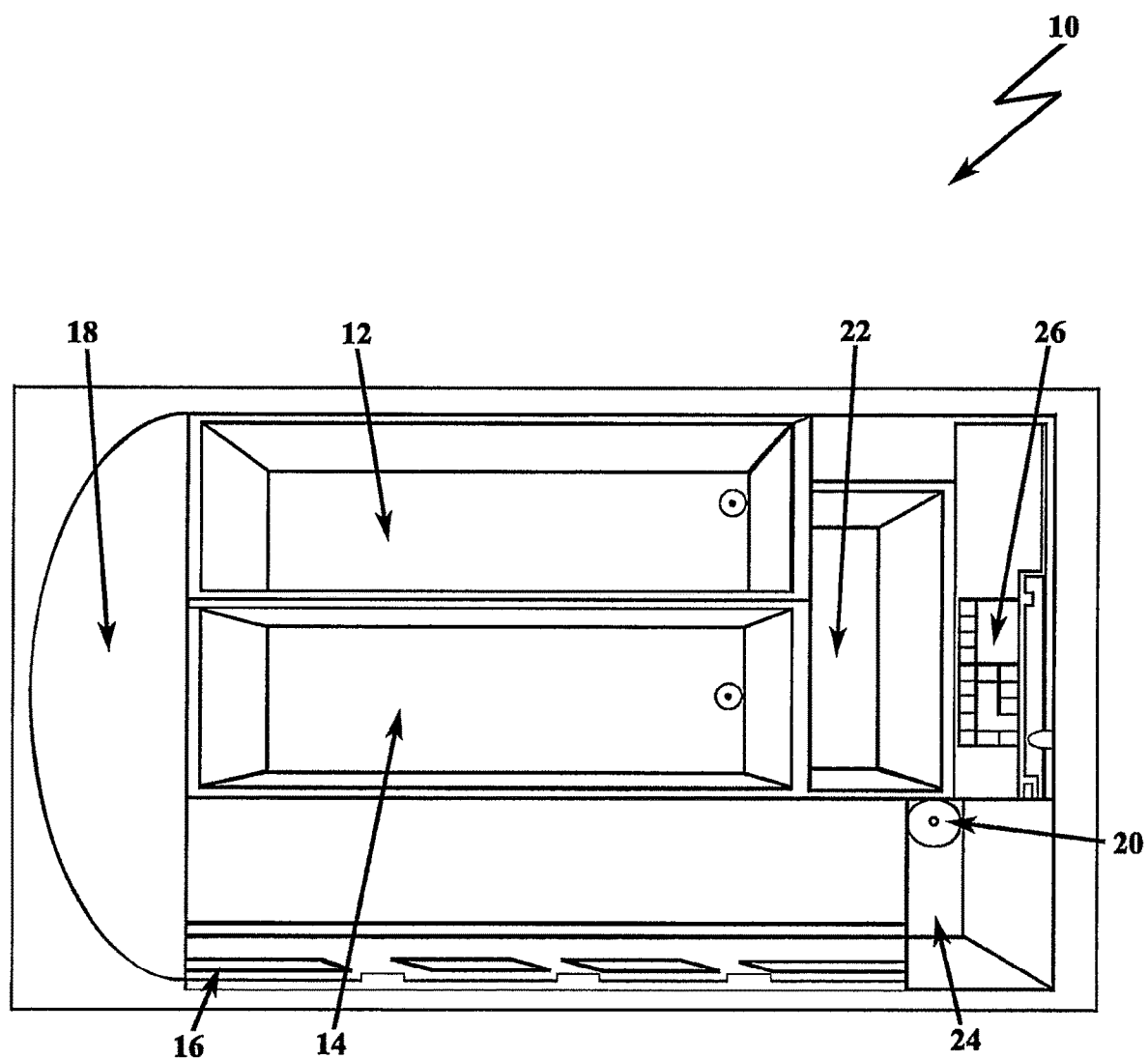
FIG. 1 depicts a filtration system 10 of the present invention for pathogen detection.

In describing the preferred embodiment of the present invention, reference will be made herein to FIGS. 1-24 of the drawings in which like numerals refer to like features of the invention.

The filtration system of the present invention performs pathogen detection using a plurality of dielectrophoretic modules of microfluidic channels with distinctive functionality and geometry to obtain separation performance which cannot be obtained in the prior art. Additionally, the present invention integrates a nano-scaled sensor with the filtration system. Advantageously, all components of the filtration system may be embedded, forming an integrated electronic-microfluidic circuit.

The assembled filtration system automatically transports, separates, condenses, and detects low amounts of particles, cells, and bacteria, or the like, from liquids in a portable configuration that minimizes false positives and negatives.

The present invention defines a robust method for separating bacteria from blood components based on their dielectric properties, localizing the bacteria, flushing substantially all remaining by-products from the bacteria, which generally are on the order of micro-sized or microscaled components, and detecting low concentrations of the bacteria. The separation is fast and reliable as species movement is caused by a module array imparting opposing forces. The module array includes a plurality of microfluidic channels with connecting microfluidic waste channels for directing undesired material away from bacteria. The process enables separation of low concentration of bacteria or other pathogens or particles from blood or other fluids, which then enables detection of the low concentration of these species. This is of great importance for medical diagnostics and determining food safety.

In a preferred embodiment, the invention includes an electronic device capable of detecting a low number of bacteria or other pathogens or particles from milliliter or larger volumes of different liquid media on a minute time scale by integrating a plurality of modules of microfluidic channels capable of performing a dielectrophoresis-based separation, and incorporating a unique capture system using field-effect-transistor based biosensors.

Bacteria present in a sample even of different types will be subject to a dielectrophoretic force in one direction, whereas all large blood components red blood cells and white blood cells will be subject to a dielectrophoretic force in another direction. Effective separation improves the detection of pathogens. Without separation, blood components which constitute a vast majority of micro-sized particles in blood, would clog active sensor sites and prevent detection of low concentrations of bacteria present in the same sample.

Furthermore, many types of sensors cannot operate in high ionic solutions such as blood plasma. Consequently, the solution containing the sample to be sensed, most likely bacteria, has to be changed to a more suitable reference solution, such as a buffer. Often a pre-concentration step is required. The capture/release mechanism presented by the present invention provides an excellent method for solution exchange without cell loss.

Electric field cell capture, release, and separation based on forces acting in opposite directions allow precise control of cell separation without risk of cell loss or contamination. Advantageously, the present invention may be applied for separating any species of comparable size in any liquid medium; however, bacteria separation from blood components, white blood cells and red blood cells, is illustrated for exemplary purposes, and represents a predominate utilization of the present invention.

FIG. 1 depicts a filtration system 10 of the present invention for pathogen detection. The system includes two injection chambers: a first injection chamber 12 containing a sample to be tested, such as blood, and a second injection chamber 14 containing a reference solution, buffer, or other liquid for flushing at a later point in the process, generally referred to as the by-product or waste-product. Injection chambers 12, 14 are connected to micro-pump inlets which connect to a microfluidic separator 16. Fluids will be pumped into microfluidic separator 16 in a controlled manner by pump 18 such that the test sample (e.g., blood) will be pumped in first. As will be discussed in further detail below, the microfluidic separator includes a plurality of microfluidic channels assembled in an array fashion that uses dielectrophoretic forces to separate continually during transport components of the test sample from one another. In the illustrative example, bacteria may be separated from red and white blood cells. The separated analyte (bacteria) is then condensed by a localized electric field, and reference solution, such as a buffer fluid, is used to replace and dilute or change the chemical composition of the blood serum that reaches condenser 20.

Unlike the prior art, the microfluidic separator 16 of the present invention includes a plurality of channels that apply dielectrophoretic forces that are exerted on the particles, cells, bacteria, and/or micro-scale components as they flow through the channels. The dielectrophoretic field is carefully chosen such that the components of interest that flow through will experience an opposite force as compared to the rest of the components or waste-products that are desired to be separated out. The waste-products are drained throughout the process from the plurality of microfluidic channels to waste chamber 22 through multiple microfluidic channel outlets.

In this manner, the filtration system of the present invention is composed of modules/segments each tuned such that the class of objects under study (i.e., the analyte) has the same response. For example, all bacterial have an nDEP, which is in the middle of the response spectrum. An additional "filter" is then applied for increased accuracy of targeting the analyte. The assembly of independent modules for this application is comprised of multiple, but not necessarily continuous, wires. Microchannel outlets, waste channels, break the continuous wire configuration. Using this geometry, surface electrode configurations may be employed, moving away from continuous conducting wire of the prior art.

In this example, isolated bacteria flows into a condenser chamber 24, which has a collecting electrode to attract the bacteria to the inlet of a microfluidic sensor 26 containing sensor arrays. Movement of bacteria to the field-effect-transistor based sensor is enhanced using the electric field and the dielectrophoretic force to overcome the diffusion limitation of the motion. Furthermore, the present invention is capable of tuning the electric field such that only the particle of interest gets through, the remaining product is eliminated. Thus, detection is label-free; it does not require sensor functionalization with specific antibodies.

The method is based on dielectrophoretic separation followed by dielectrophoretic concentration, and replacement or partial replacement or dilution of the original liquid with a reference solution. The next step is dielectrophoretic manipulation of bacteria to the sensor surface to overcome the diffusion limitation and enable bacteria contact with the sensor surface for detection.

The device operation and automated sample preparation is described in some detail below. First, a test sample injection is distributed into the system. This is performed by a pump that causes the automated distribution of the test sample, placing the test sample in a plurality microfluidic channels (microchannels) via capillary forces (porous media) and pump-pressure driven flow. Each of the plurality of microfluidic channels are lined with electrode geometry capable of establishing an electric field and a dielectrophoretic force on the test sample. Separation within the microfluidic channels is then performed by the dielectrophoretic force. In order to achieve adequate and efficient separation, waveform tuning of the electric field is selected with the intention that two types of species are subjected to forces acting in opposite directions. The separation occurs within microfluidic separator 16. The unwanted micro-scaled components and blood cells (waste-product) separated from the analyte (bacteria/cells/particles) are collected in waste chamber 22. The separated analyte is then collected on condenser 20. An electrode immobilizes the desired analyte material.

In order to remove the waste-product, extraneous serum and other unwanted blood products, the remaining analyte is exposed to a reference solution while held by the condenser electrode. In this manner the unwanted blood products are flushed away, replaced or at least partially replaced, and/or diluted by the reference solution. The remaining analyte is localized to a sensor surface. Dielectrophoretic manipulation of bacteria is used at the sensor surface to overcome the diffusion limitation and enable bacteria contact with the sensor surface for detection.

Preferably the sensor is of nanowire or nanoribbon technology, which enables the filtration system of the present invention to be integrated on a semiconductor chipset. Once the final analyte is interrogated, the output may be digitized for automated data processing and readout.

In a preferred embodiment, a multi-step approach to filtration for pathogen detection is achieved using a plurality of dielectrophoretic modules including a plurality of microfluidic channels in an array fashion. The microfluidic separator 16 separates the test sample components of interest (e.g., bacteria) from pollutants (e.g., blood cells and blood serum). In a subsequent process step, the surrounding medium is then exchanged or diluted with a reference solution more suitable for comprehensive electronic detection applications.

The process introduces condensation of the analyte onto a concentrating electrode using a dielectrophoretic (pDEP) force. Once all remaining analyte from the sample is collected on the condensing electrode and the remaining wasteproduct has been exchanged with the reference solution, the frequency of the applied electric field is then changed (generally from high to low) so that the dielectrophoretic force changes sign and becomes repulsive, and the analyte is then released into a small (~1 µl) volume of the reference solution. Next, the analyte is transported to the sensor chamber and restricted in the vicinity of the sensor. Detection is then performed by sensor arrays, selectively functionalized for the target analyte (bacteria) of interest.

Figure 2:
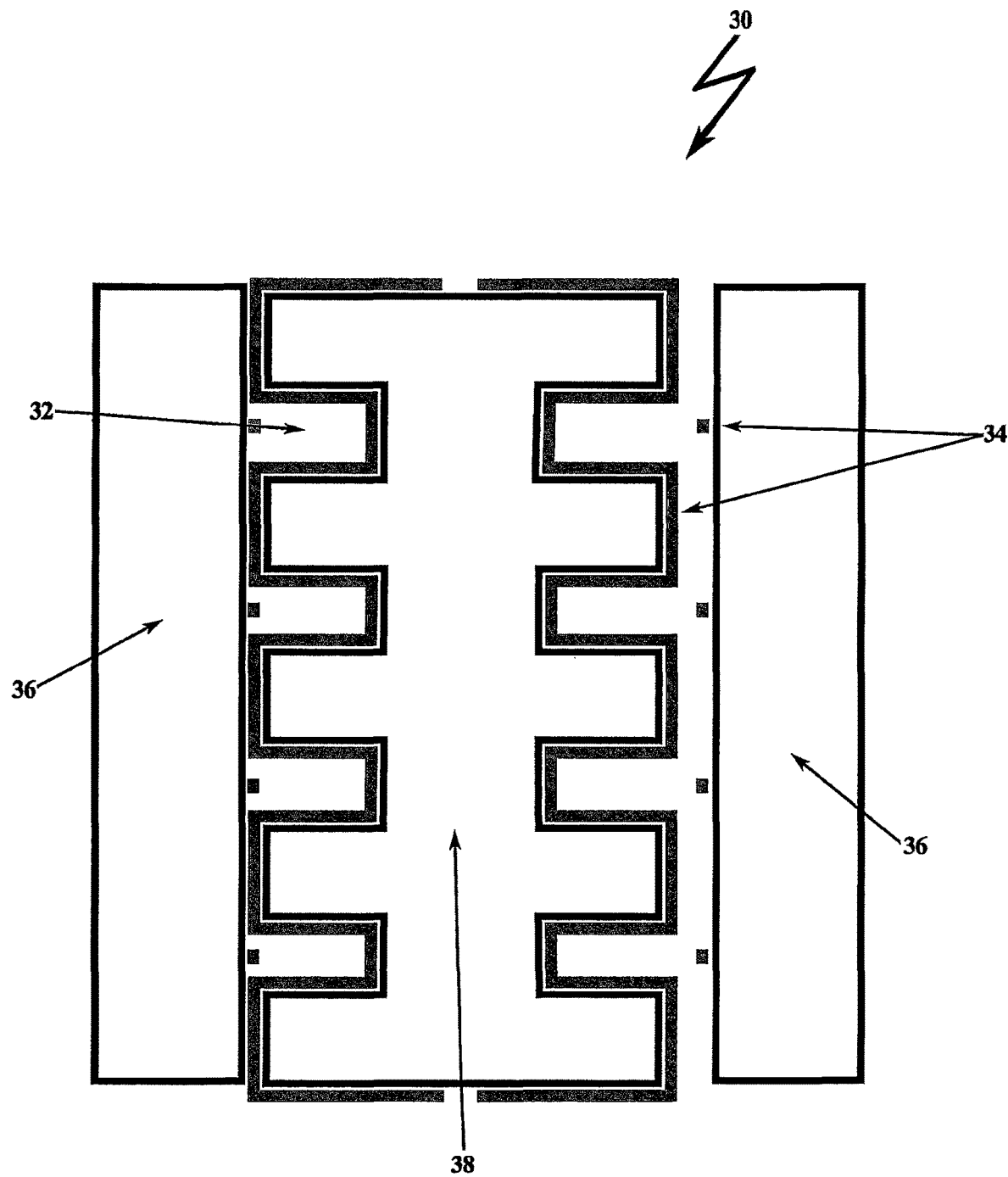
FIG. 2 is a schematic view of a microchannel assembly having a plurality of individual microchannels.

Microfluidic separator 16 is comprised of a high throughput system of multiple microchannels, preferably an array 10×100 microchannels although any number of microchannels may be utilized with varying degrees of efficiency. FIG. 2 is a schematic view of a microchannel assembly 30 having a plurality of individual microchannels 32. Each microchannel assembly 30 has multiple-outlet linear microchannels 32 with copper/metal sets of electrodes 34 deposited on the microchannel walls. In a preferred embodiment, microfluidic microchannel assembly 30 includes plates 36 patterned with metal electrodes 34, such as copper and the like, on each side, generally having a preferred geometry of 5 µm×10 mm×1 µm, sandwiching an internal channel structure or "tree" 38 outlined with copper electrodes 34. When plate 36 comes in contact with internal channel structure 38, multiple microfluidic channels are formed. Plates 36 and internal channel structure 38 may comprise plastic material or other light, durable material capable of securing metal electrodes, and containing the test sample without degradation.

An additional electrode design is introduced for high yield pathogen (bacteria and cell) capture, and which lends itself to enhanced and reliable separation using an alternating electric field.

The capture of pathogens is generally from blood, water, and other fluids, and the separation includes the removal of pathogens from, for example, large blood components, red blood cells, white blood cells, and the like.

Figure 18:
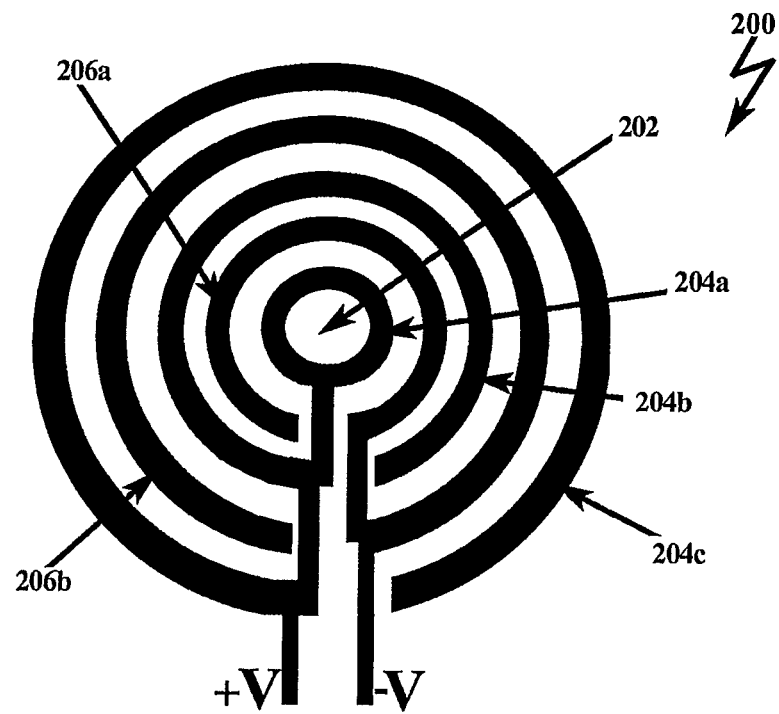
FIG. 18 depicts an embodiment of the electrode design 200 for use within the confines of a microchannel.
Figure 19:
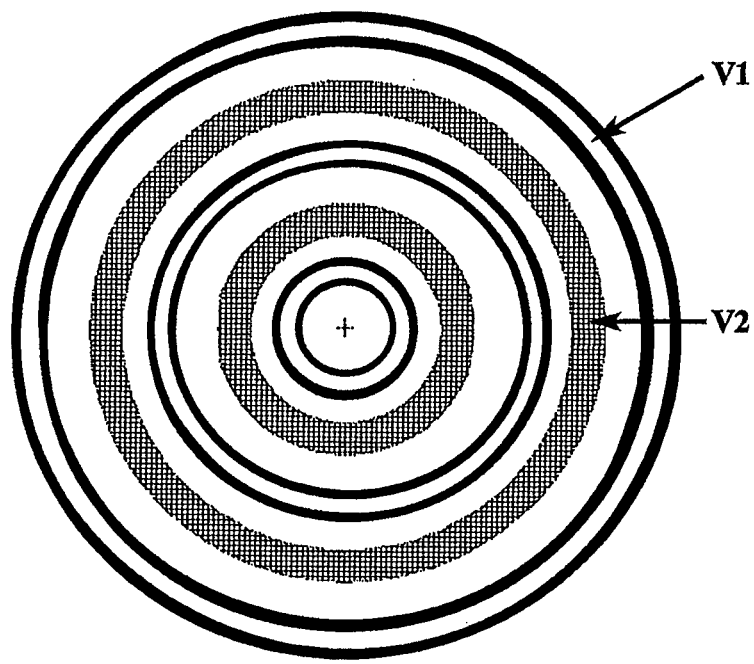
FIG. 19 depicts an electrode design having a set of adjacent concentric rings.

The purpose of optimizing the electrode design for this application is to maximize the yield for a given applied voltage. FIG. 18 depicts an embodiment of the electrode design 200 for use within the confines of a microchannel. Electrode 200 is composed of a set of densely packed conductive rings fragments 204, 206. The rings may be connected separately to a voltage source or multiple voltage sources, or interconnected and attached to a single voltage source. Electrode 200 may include concentric rings, connected rings, or a spiral configuration. An embodiment depicting a set of adjacent concentric rings is shown in FIG. 19. In this embodiment, the rings are coaxial, extending radially outwards from a center point 202. The innermost or first ring 204a may be electrically connected to the third ring 204b, which may be electrically connected to the fifth ring 204c, and so on for the odd numbered rings extending radially from center point 202. Each of the odd numbered rings are either electrically connected together to have a same first voltage and polarity, for example V+, or connected separately to at least one voltage source having the same voltage and polarity. In a similar fashion, the even numbered rings extend radially from center point 202 and may be electrically connected together. As depicted in FIG. 18, second ring 206a may be electrically connected to the fourth ring 206b, which are connected to a single voltage source having a second polarity, for example V−, the second voltage being different from the first voltage in either magnitude, polarity, or both. Each of the even numbered rings are either electrically connected together to have a same second voltage and polarity, or connected separately to at least one voltage source having a second voltage and polarity.

An alternating current (AC) electric field is applied to the electrode at a predetermined frequency or frequencies in the range of 1 kHz to 400 MHz, such that the resulting force acting on the different species allows for a differential response. The method can be applied for separation of similar size particles also from fluids other than blood.

Figure 20:
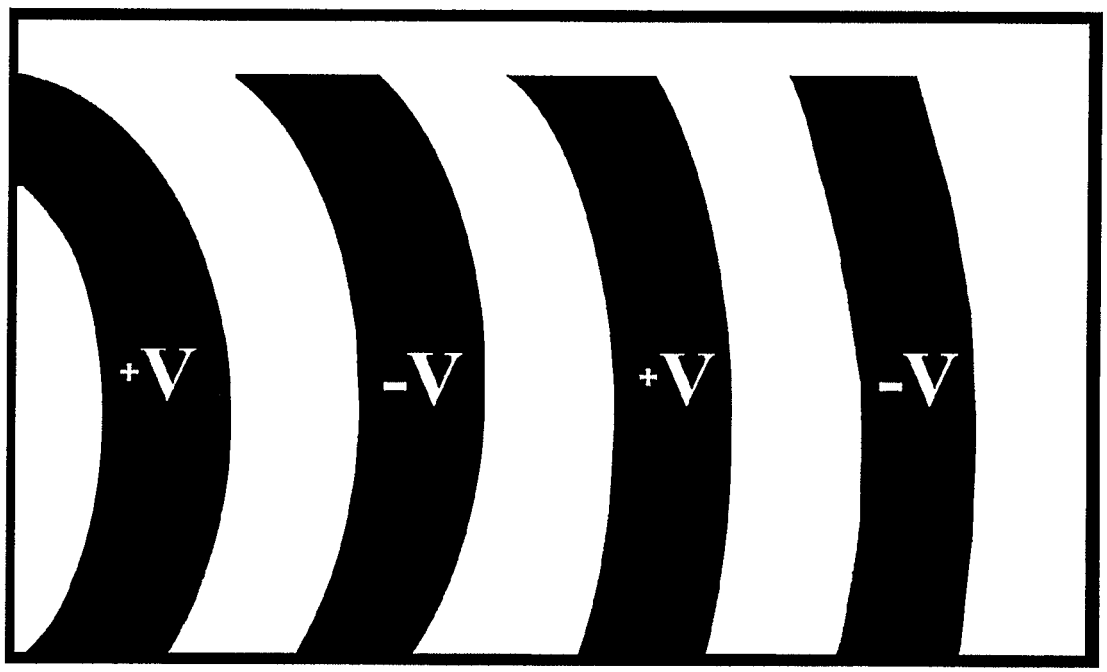
FIG. 20 depicts the electrode of FIG. 19 delineating alternating polarities associated with a positive voltage source connected to one set of electrode rings, and a negative voltage source connected to another set of electrode rings, where each ring of each set alternates radially outwards from the center point.

FIG. 20 depicts the alternating polarities associated with a positive voltage source connected to one set of electrode rings, and a negative voltage source connected to another set of electrode rings, where each ring of each set is concentric and alternates radially outwards from the center point, one set representing the odd numbered rings and the other set representing the even numbered rings.

Figure 21:
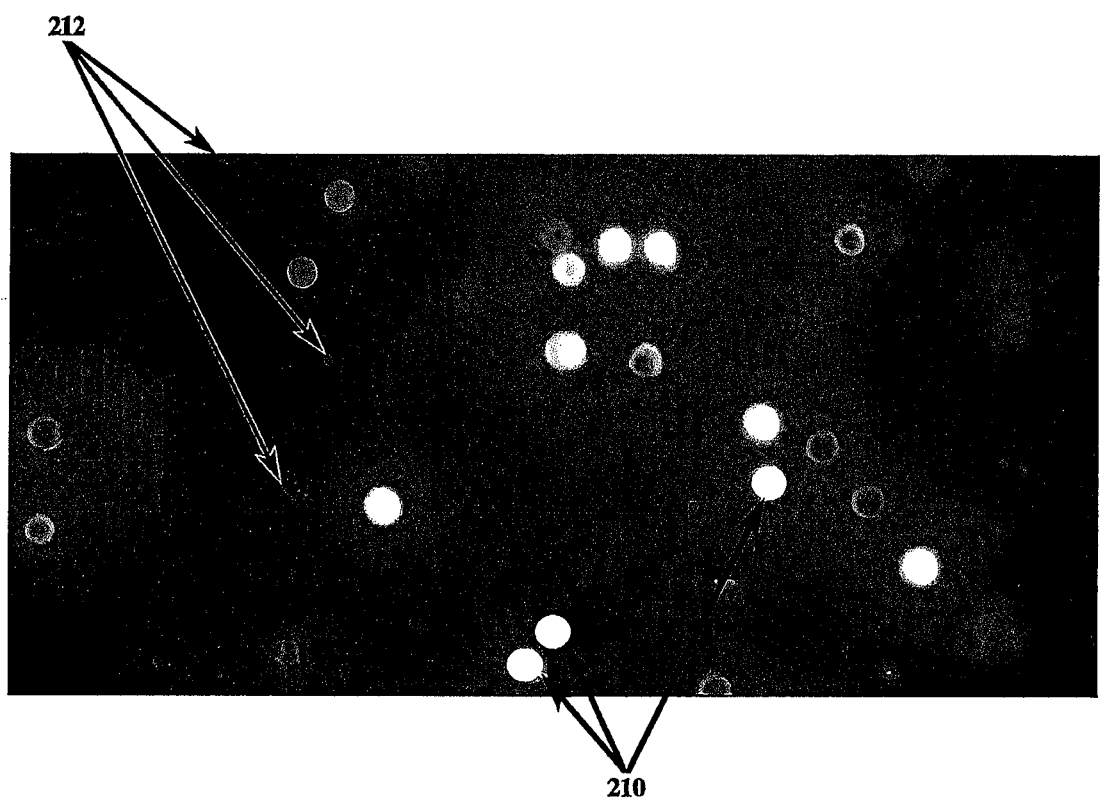
FIG. 21 depicts a typical pathogen contaminated fluid inside a microchannel of the present invention in the absence of an electric field to the electrode.
Figure 22:
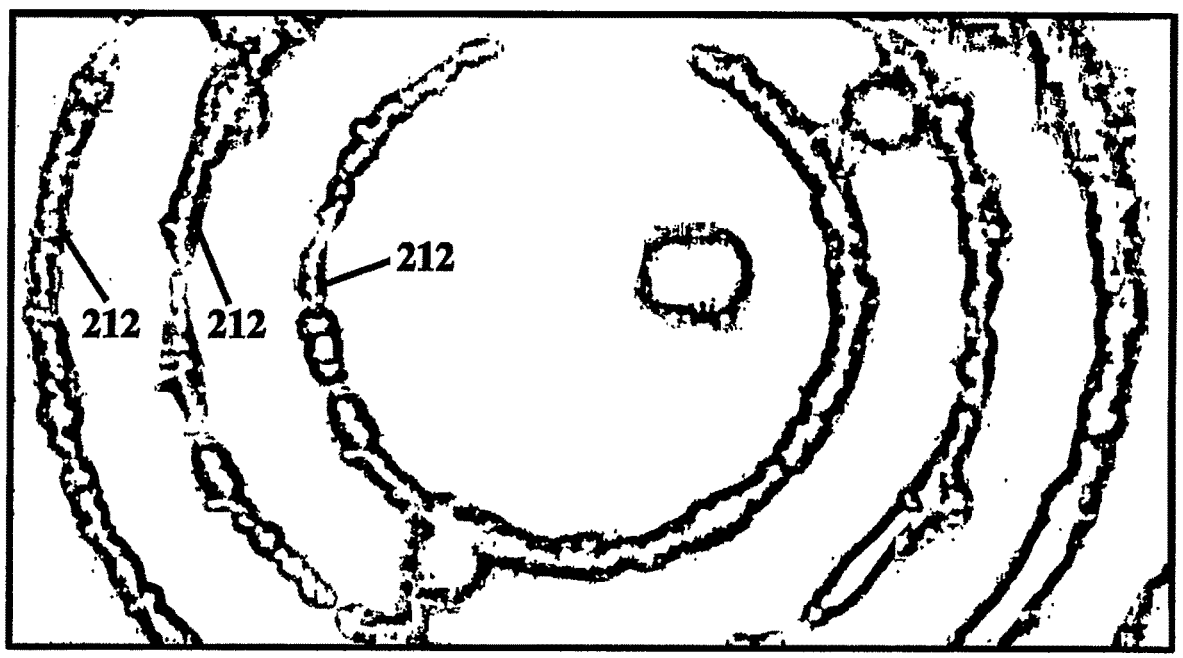

FIG. 21 depicts a typical pathogen contaminated fluid inside a microchannel of the present invention. Red blood cells 210 and *E. coli* 212 are present in the fluid. FIG. 22 depicts the same microchannel containing contaminated fluid with the electric field ON. As can be seen, the *E. coli* 212 aligns with the curvature of the electrodes under the dielectrophoresis force. This force "holds" or redirects the pathogen while the carrier fluid (blood) traverses through the microchannel.

Figure 23:
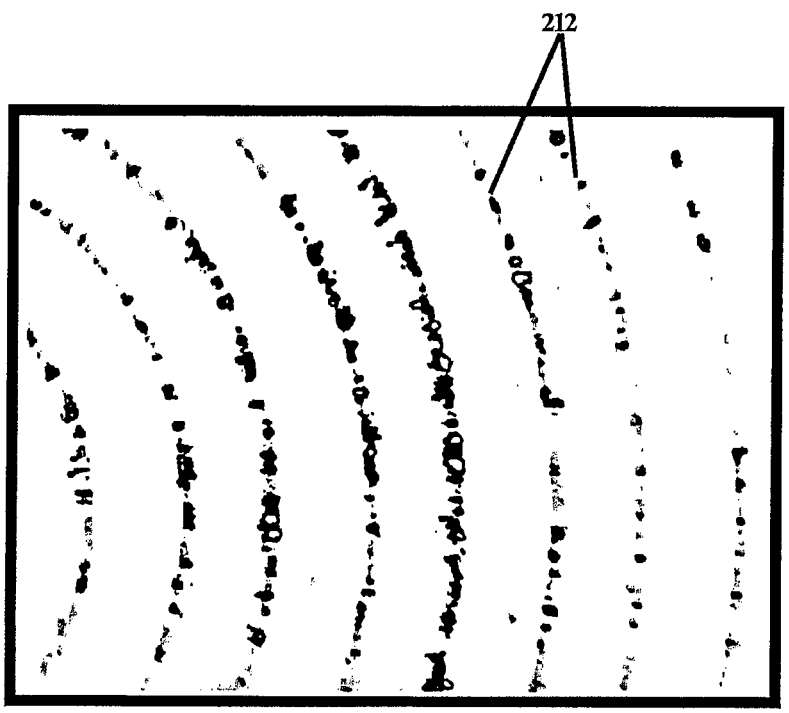
FIG. 23 depicts the alignment of pathogens when a positive dielectrophoresis force (pDEP) of 3 volts at 10 MHz is applied to the electrode.
Figure 24:
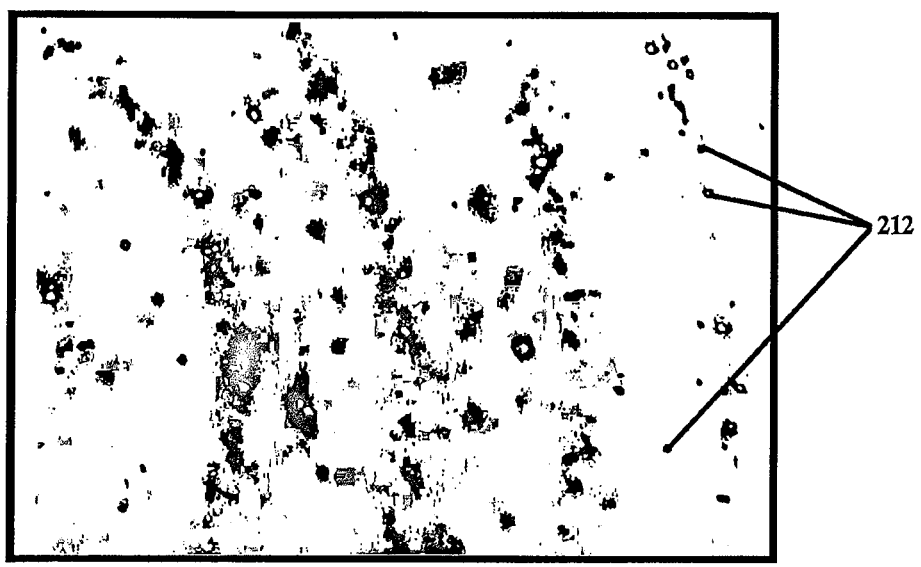
FIG. 24 depicts the absence of pathogen alignment when a negative dielectrophoresis force (nDEP) of 3 volts at 200 MHz is applied to the electrode.

As depicted by FIG. 23, a positive dielectrophoresis force (pDEP) of 3 volts at 10 MHz was shown to align the pathogens effectively and efficiently. This is in stark contrast to a negative dielectrophoresis force (nDEP) of 3 volts at 200 MHz as depicted in FIG. 24. This illustrates the frequency dependence of establishing pathogen attraction or repulsions.

Preferably, voltages of opposite polarity are applied to adjacent rings, or a different voltage level is applied to adjacent rings, such that there exists a potential difference between adjacent rings. Thus, either $V_1=-V_2$, or there is a phase difference between the two voltage sources ($V1=V \sin(\omega t)$; $V2=V \sin(\omega t+\pi)$), or the magnitude of $V_1$ is not equal to the magnitude of $V_2$.

Figure 3:
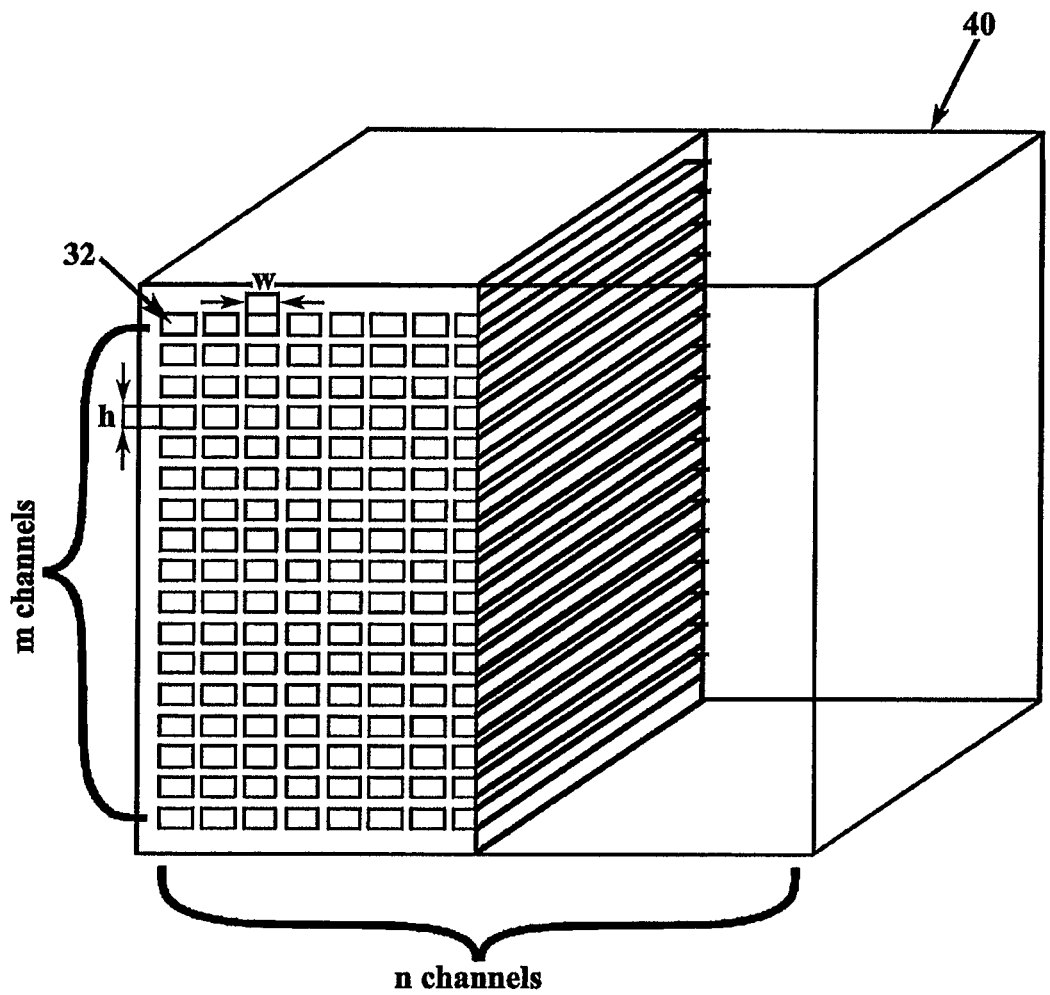
FIG. 3 is a schematic view of an array of microfluidic microchannel assemblies of the present invention used for separation.

FIG. 3 is a schematic view of an array 40 of microfluidic microchannel assemblies 30 of the present invention used for separation. The invention provides for an assembly of layers with defined components of multiple microchannels. Microchannel assemblies 30 are stacked such that array 40 comprises an "m×n" microchannel array. Each microchannel 32 has a height h and width w. In a preferred embodiment, each microchannel 32 is approximately 100 μm wide and 100 μm high. The preferred length of each microchannel 32 is 10 mm. Other dimensions may be pre-determined for particular efficiencies and for specific test samples. The advantage of an array of microfluidic channels is the ability to transport and separate the test sample in an extremely small package—on the order of an integrated circuit. The chip-set size of the filtration system promotes reliability, portability, and discrete packaging.

In a preferred embodiment, array 40 is composed of multiple plates 36 sandwiching internal channel structures 38 such that when stacked they form an array of 10 (horizontal)×100 (vertical) microfluidic channels. The 11 layers are aligned to the edges and thermally bonded.

In an assembled microfluidic separator 16, laminar flow conditions are provided for separation. Under preferred operating conditions, flow velocity, v, is approximately 100 μm/s, channel length, L, is about 1 cm, the total flow time through a single channel, $t_{flow}$, is on average about 100 s, and the flow rate per channel is about 1 nL/s. Thus, in total 1 cc is pumped very quickly through 1000 microchannels.

The test sample throughput may be "tuned" by increasing or decreasing the number of parallel microchannels, increasing or decreasing the parallel stacked microchannel assemblies 30, and changing the flow velocity by setting the pumping speed.

The invention utilizes the frequency dependence of the sign of the CM factor between different contaminant/blood species for separation in a series of custom designed dielectrophoretic modules.

For the purposes of the present invention, a coefficient α will be defined as follows:

$$\alpha = 2\pi \in_m r^3 Re\{CM(\omega)\}; \text{ and}$$

$$F_{DEP} = \alpha \cdot \nabla E^2;$$

where CM(ω) is as defined previously.

The α coefficient accounts for the particle size r and the dielectric properties of the particle itself $\in_p$ and the surrounding medium $\in_m$.

Thus, the invention provides for separation of species based on the different signs of the Re{CM(ω)} factor and which follows the different signs of the α coefficient at a chosen operating frequency. The separation method of two select groups of the components of interest, i.e., pathogens/cells/bacteria/particles (group 1) and blood cells (group 2), is based on tuning the electric field frequency such that the Re{CM(ω)} factor is positive for one group and negative for the other group. This causes component movements in different directions, which leads to separation. Unlike the prior art, the microfluidic separator is uniquely designed to complete separation, and the subsequent condensing and flushing process steps result in pure isolation of the bacteria, cells, or particles of interest.

A description for bacteria in blood is provided below for the separation, capture, and release mechanisms, and for flow conditions inside a microfluidic channel. Figures of force fields are generated from program runs using COMSOL Multiphysics software.

Figure 4:
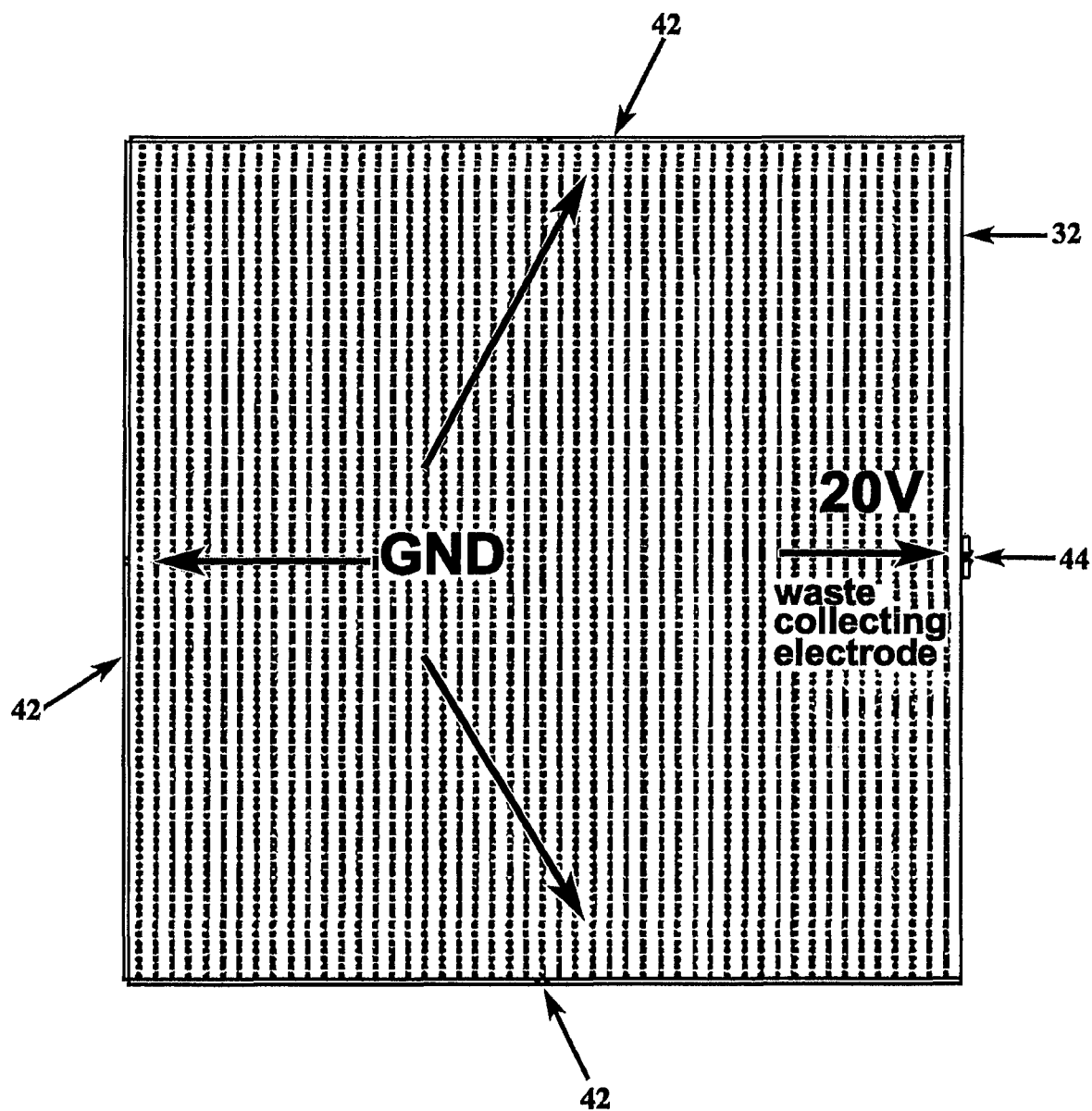
FIG. 4 depicts a cross-section of microchannel with ground electrodes and waste collecting electrode.
Figure 5:
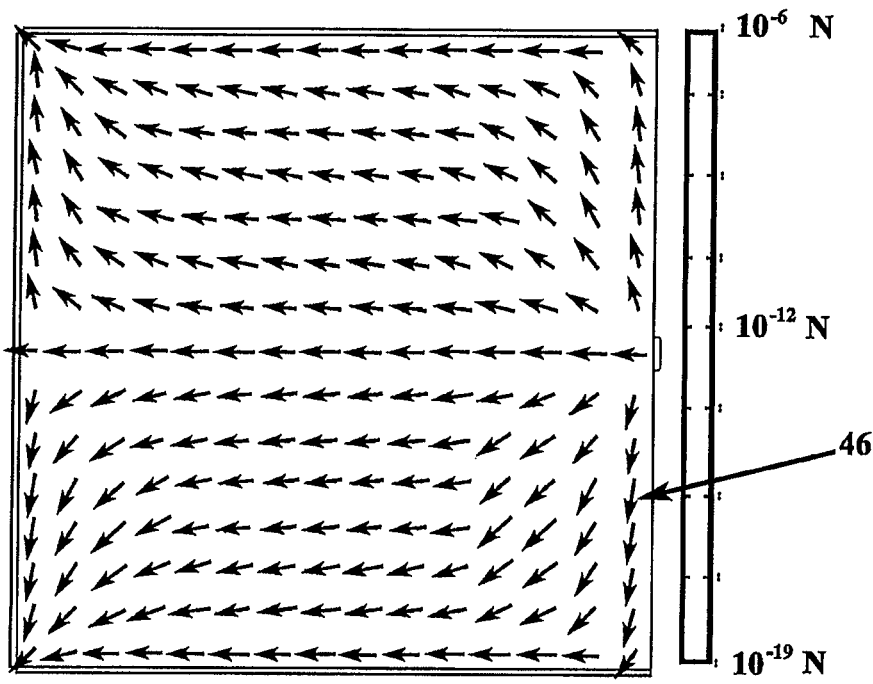
FIG. 5 depicts a computer generated model of the resulting dielectrophoretic forces $F_{DEP}$ acting on bacteria in microfluidic channels.
Figure 6:
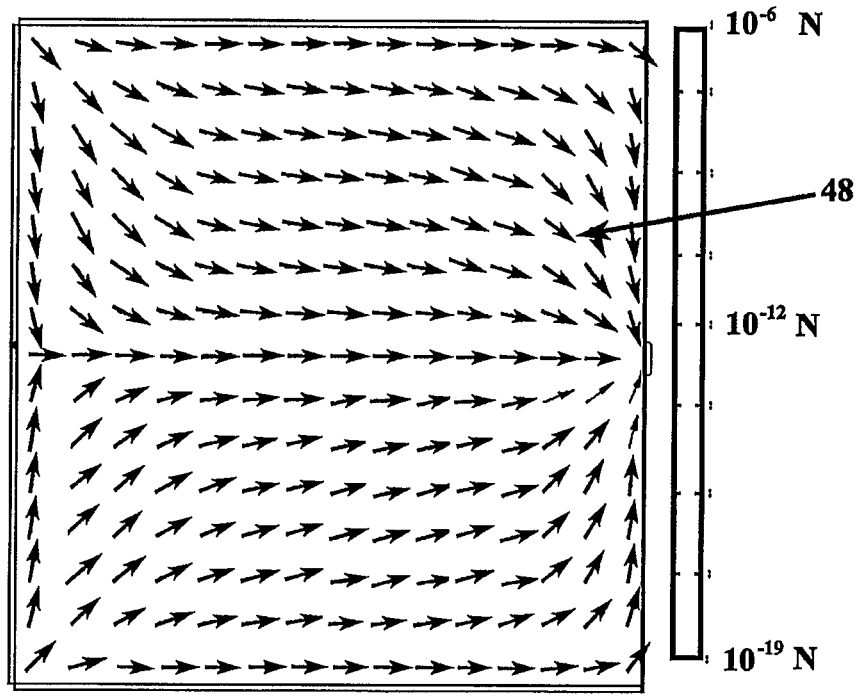
FIG. 6 depicts a computer generated model of the resulting dielectrophoretic forces acting on red blood cells in microfluidic channels.

An electric field gradient is generated by an electrical waveform applied to sets of electrodes on the plurality of microchannel walls. FIG. 4 depicts a cross-section of microchannel 32 with ground electrodes 42 and waste collecting electrode 44. In this example, 20 volts are applied to waste collecting electrode 44. The resulting dielectrophoretic forces $F_{DEP}$ acting on bacteria are depicted by arrows 46 in FIG. 5, while the dielectrophoretic force acting on red blood cells are shown by arrows 48 in FIG. 6. These forces indicate that $F_{DEP}$ for bacteria has an opposite direction from $F_{DEP}$ for red blood cells.

Figure 7:
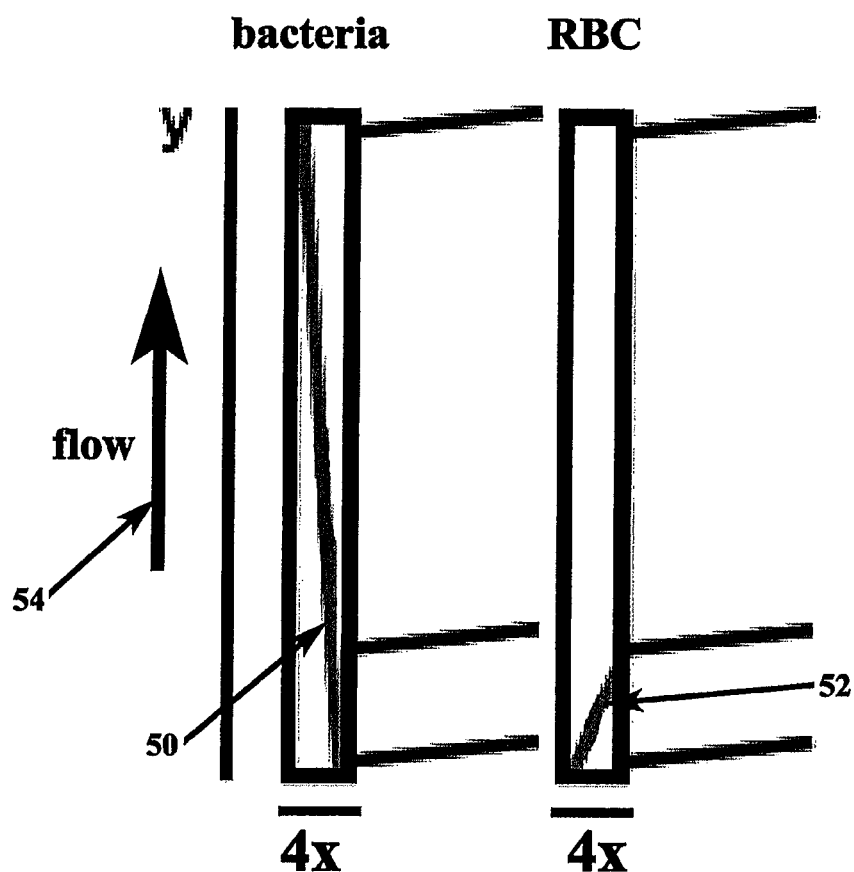
FIG. 7 is a cross-sectional top view of a microchannel showing the trajectories of the test sample components.

FIG. 7 is a cross-sectional top view of a microchannel 32 showing the trajectories of the test sample components. Trajectories of bacteria 50 and red blood cells 52 in the direction of flow 54 are depicted for pre-determined electrode geometry inside one of the many microfluidic channels 32 that comprise microfluidic separator 16. Under the applied wave form, bacteria and red blood cells are pushed towards opposite ends of the microchannels.

As an illustrative example, the values of α are selected for E. coli bacteria, red blood cells, and white blood cells based on pre-determined permittivity data (real and imaginary permittivity $\in_p$, $\in_m$, particle radius r, and conductivity σ).

The dielectrophoretic force acting on E. coli bacteria, red blood cells (RBC), and white blood cells (WBC) is generated by applying a voltage, which in the preferred embodiment is approximately 20V, on the electrodes at different operating frequencies. The provided values of the coefficient α for RBC, WBC, and bacteria at 10 MHz in blood serum are shown in Table I identified in FIG. 8.

In Table I (FIG. 8), the real and imaginary part of the complex dielectric function, conductivity, coefficient α, and the real part of the Clausius-Mossotti factor are calculated at 10 MHz for two different types of bacteria (E. coli and Micrococcus), white blood cells (T lymphocytes, monocytes, B lymphocytes, and granulocytes), and red blood cells.

Figure 9:
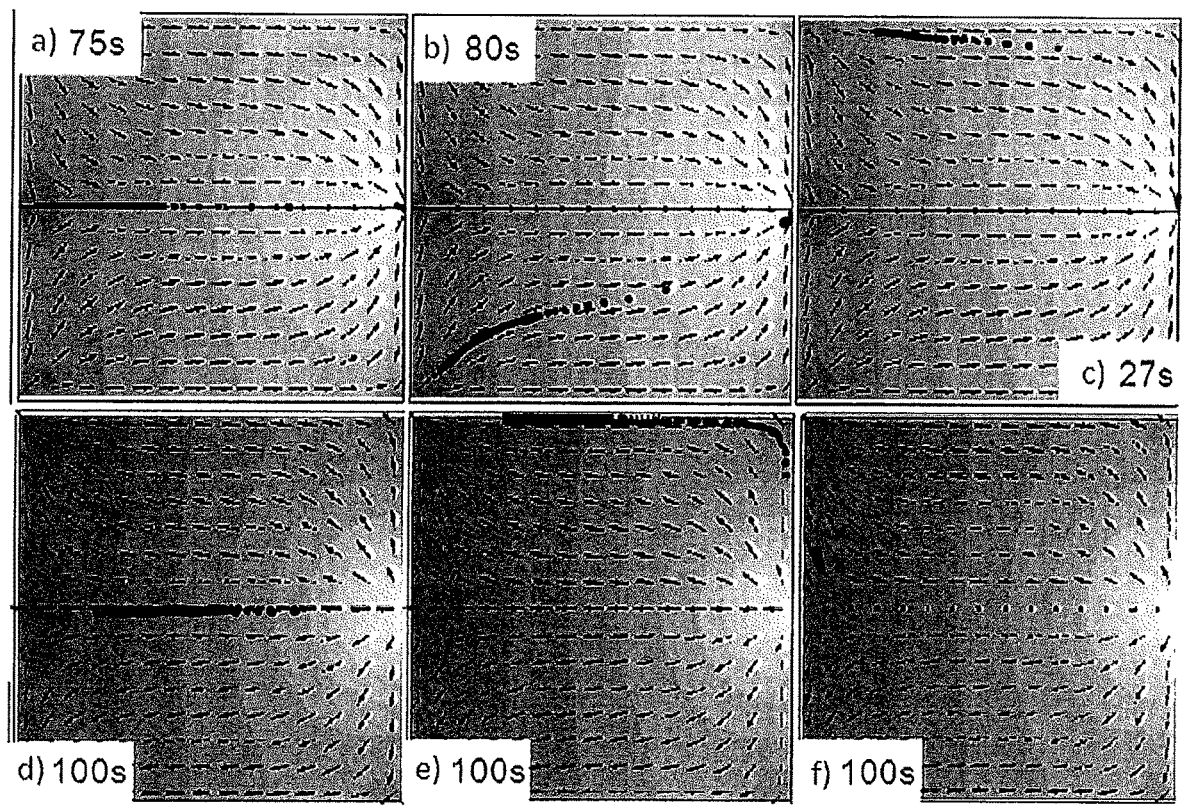
FIG. 9 depicts a computer generated model of bacteria and red blood cell trajectories upon applied dielectrophoretic force in a microfluidic channel.

In this example, α is negative for bacteria and positive for the blood components, thus effecting separation under dielectrophoretic force. At an electric field frequency of 10 MHz, and using blood serum as a surrounding medium, bacteria (E. coli and Micrococcus), experience a negative dielectrophoretic force, while at the same operating conditions the blood components, WBC and RBC experience a positive dielectrophoretic force. Bacteria and red blood cell trajectories upon applied dielectrophoretic force in the microchannel are depicted in FIG. 9. Arrows denote the direction of the dielectrophoretic force acting on red blood cells and bacteria. The time based trajectory of motion for different initial positions of red blood cells is depicted in boxes a, b, and c. The time based trajectory of motion for different initial positions of bacteria is depicted in boxes d, e, and f. As shown, red blood cells initially positioned near microchannel walls far from the blood cell collecting electrode reach the blood cell collecting electrode in less than one hundred seconds. In the same electric field, bacteria are pushed away from the blood cell collecting electrode and directed towards the channel medium.

The dielectrophoretic force acting on red blood cells is directed towards the field maximum, where the waste collecting electrode is placed. The dielectrophoretic force confines bacteria within a certain "safe" region of the microchannel as shown in FIG. 9, boxes d, e, f, while it pushes blood cells in the opposite direction, which is towards the waste collecting electrode and the waste channels as shown in FIG. 9, boxes a, b, c. In this manner, separation occurs continuously during test sample transport through the microfluidic channels, with each microchannel doing its part to separate test sample components.

In the current example, utilizing the preferred array geometry for the microfluidic separator array with lateral and vertical DEP electrodes, the provided separation efficiency of E. coli from RBC and WBC components was nearly 95% in about 15 seconds, and 100% for an approximately 100 micron channel length in a timeframe of approximately one minute. The microfluidic separator comprising an array of microfluidic channels, each acting to separate the test sample and direct waste-product towards a waste chamber.

Unique to the present invention, a branched microfluidic design allows for separated components to be discarded as waste, while the target of interest, for example *E. coli*, is transferred to a condenser, flushed, and then localized for pathogen detection by an electronic sensor. The invention is not dependent upon a single critical dimension fabrication or alignment, and the waveform frequencies may be tuned to change the differential sign of the Re{CM(ω)} factor for different components to be separated. The cross-over frequency varies for different particles, bacteria, and/or cells in different media.

The values of the α coefficient for bacteria *E. coli* and *Micrococcus* in buffer solution and blood serum at frequencies 10 MHz and 400 Mhz are provided in Table I of FIG. 8 and Table II of FIG. 10. In Table II (FIG. 10), the pre-determined values for the real and imaginary permeability as well as the particle radius and conductivity are listed. To enhance separation efficiency a pre-determined waveform containing frequency components tuned for particular species (particles/bacteria/cells) of interest is used.

Continuing with the example above, the α coefficient for *E. coli* and *Micrococcus* is negative and has a different magnitude in blood serum at 10 MHz, which for *E. coli* $\alpha = -0.0044(10^{-24})$ J(m/V)$^2$, and for *Micrococcus* $\alpha = -0.0027(10^{-24})$ J(m/V)$^2$, while the α coefficient is positive and has a similar magnitude in blood serum at 400 MHz (*E. coli* $\alpha = 0.0044(10^{-24})$ J(m/V)$^2$, *Micrococcus* $\alpha = 0.0043$ $(10^{-24})$ J(m/V)$^2$). *Micrococcus* and *E. coli* will experience a very similar force in blood serum at 400M Hz, while they will experience a very different (opposite) force in the same medium, blood serum, at a frequency of 10 MHz.

The α coefficient for T. Lymphocytes is positive ($\alpha = 0.0136(10^{-24})$ J(m/V)$^2$) in blood serum at 10 MHz. Thus, the DEP force (negative DEP) exerted on bacteria in blood serum at 10 MHz has an opposite sign then the DEP force (positive DEP) exerted on T. Lymphocytes in blood serum at 10 MHz.

Consequently, a waveform applied to the electronic device of the present invention, containing only a frequency component at 400 MHz will result in a very similar behavior of both *E. coli* and *Micrococcus*, causing similar motion of both products. A waveform applied to the electronic device containing only a frequency component at 10 MHz will result in a similar motion of both *E. coli* and *Micrococcus*, and this motion will be in the opposite direction of T. Lymphocytes.

A waveform applied to the device containing both frequency components 10 MHz and 400 MHz will result in a motion of *Micrococcus* while the force will cancel for *E. coli*, resulting in a lack of motion of *E. coli*.

A choice of a waveform in the same medium allows differentiating and fingerprinting different species. Unique to the present invention, a sequence of an array of modules with tuned waveforms would allow selecting species based on their unique dielectric function.

After passing through the segments of microfluidic separator 16, the first component of the filtration system, the targets of interest (e.g., bacteria) are separated from pollutants (e.g., blood cells), at which point, the targets of interest are then condensed by condenser 20.

In a preferred embodiment, condenser 20 uses the change of the Re{CM(ω)} factor upon the change of the medium permittivity ($\in_m$) for species capture on a capturing electrode, to reduce the volume of the sample and condense the species bacteria, cells, and/or particles in a significantly lower volume. A collecting electrode attracts the bacteria to the inlet of a microfluidic sensor 26 containing sensor arrays. Movement of bacteria to a field-effect-transistor based sensor is enhanced using the electric field and the dielectrophoretic force to overcome the diffusion limitation of the motion.

Figure 11A:
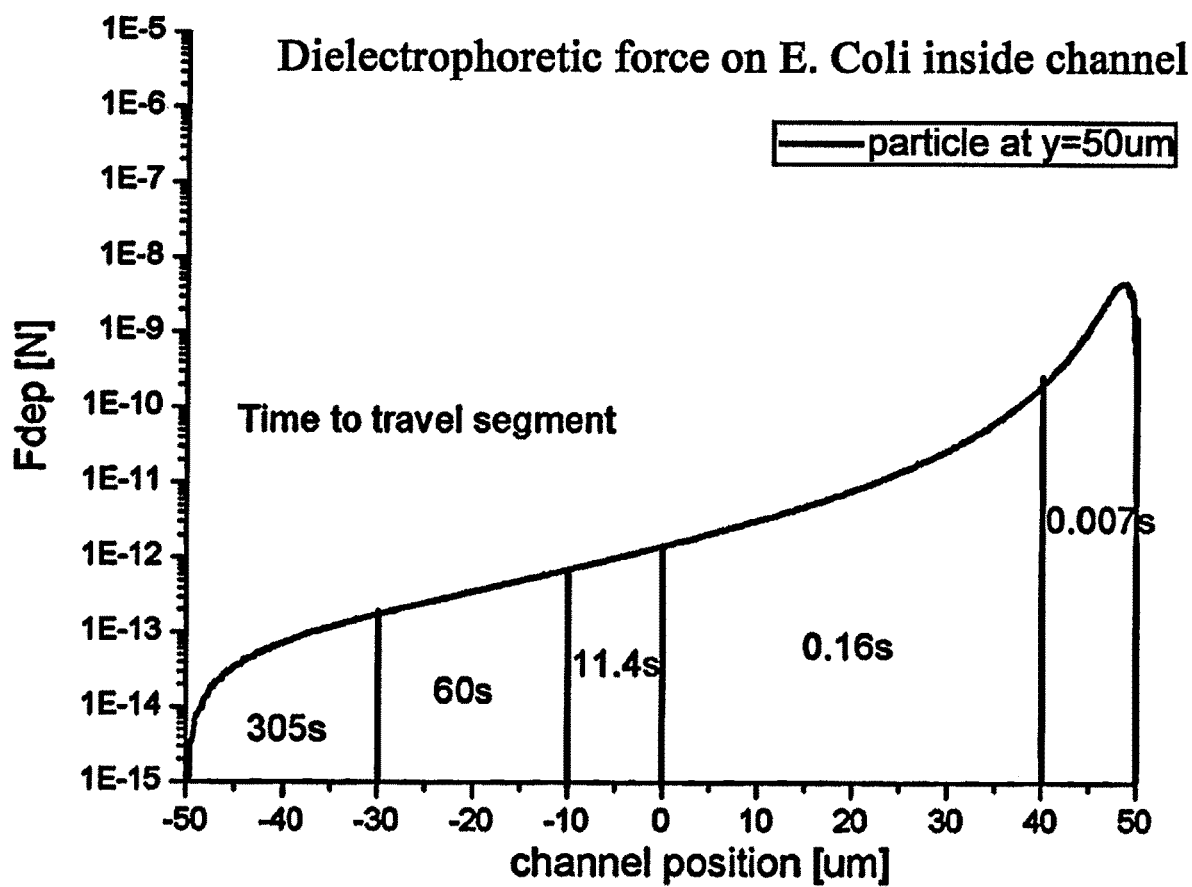
FIG. 11A depicts a graph of a simulation of the dielectrophoretic force on *E. coli* inside a microfluidic channel as a function of channel position and travel time.
Figure 11B:
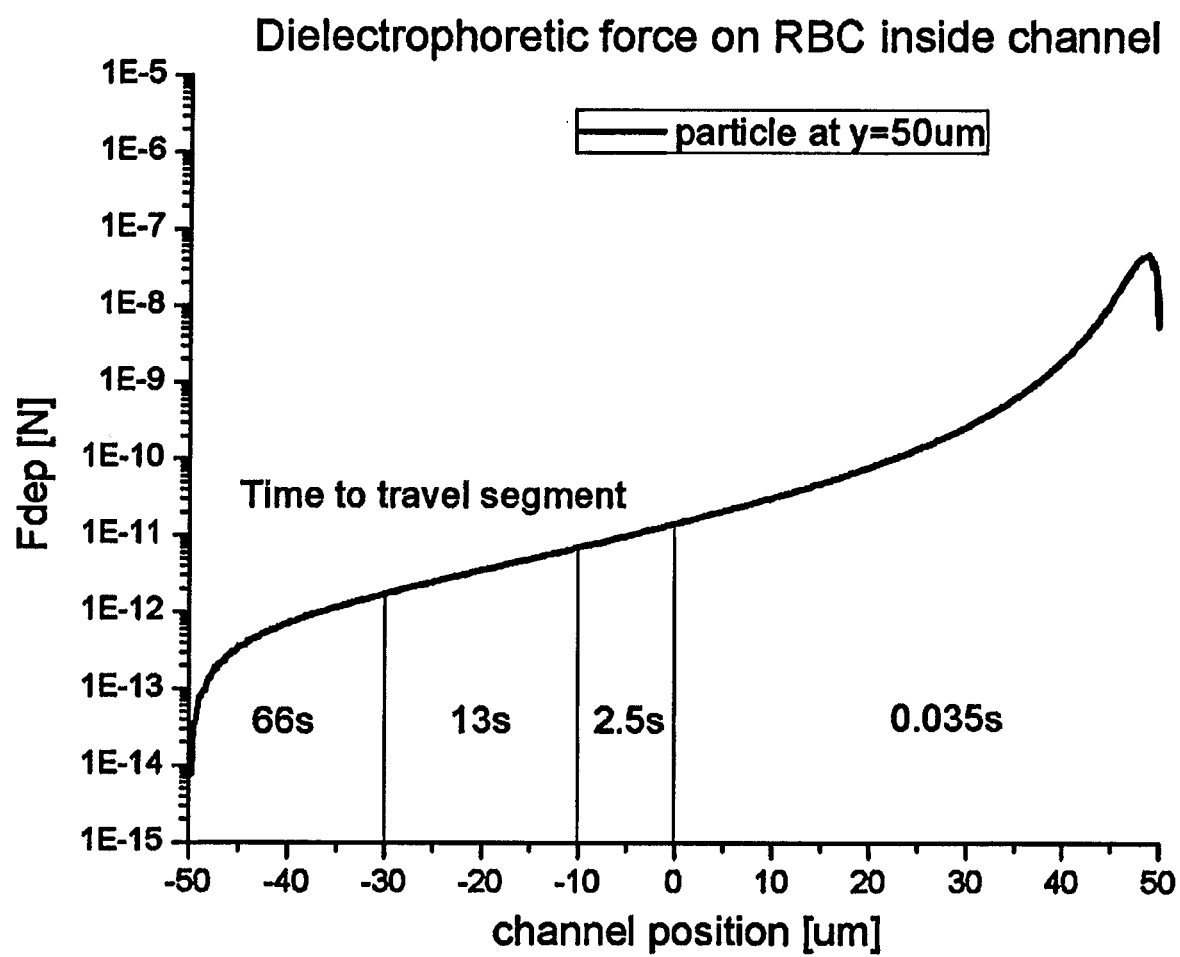
FIG. 11B depicts a graph of a simulation of the dielectrophoretic force on RBCs inside a microfluidic channel as a function of channel position and travel time.

FIG. 11A depicts a graph of a simulation of the dielectrophoretic force on *E. coli* inside a microfluidic channel as a function of channel position and travel time. FIG. 11B depicts a graph of a simulation of the dielectrophoretic force on RBCs inside a microfluidic channel as a function of channel position and travel time. These simulation results show that bacteria, if placed within 10 μm of the elimination electrode, are repelled towards the safe zone within 0.007 seconds. For RBCs, the elimination time is shorter than 82 seconds. Fifty percent (50%) of the RBCs are filtered out within the first 0.5 seconds. Ninety-five percent (95%) of the RBCs are filtered out within the first 16 seconds, and substantially all of the RBCs are filtered out within the first 82 seconds.

Figure 12:
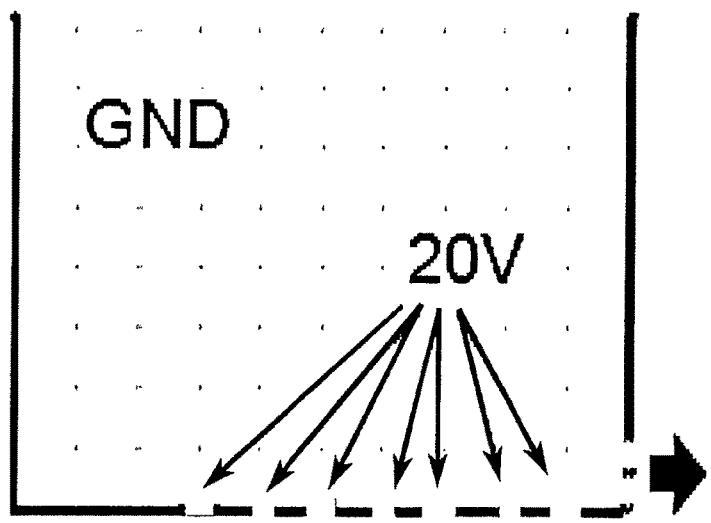
FIG. 12 depicts a set of electrodes and their respective geometry in a cross-section of a microfluidic channel for capturing and immobilizing bacteria.
Figure 13:
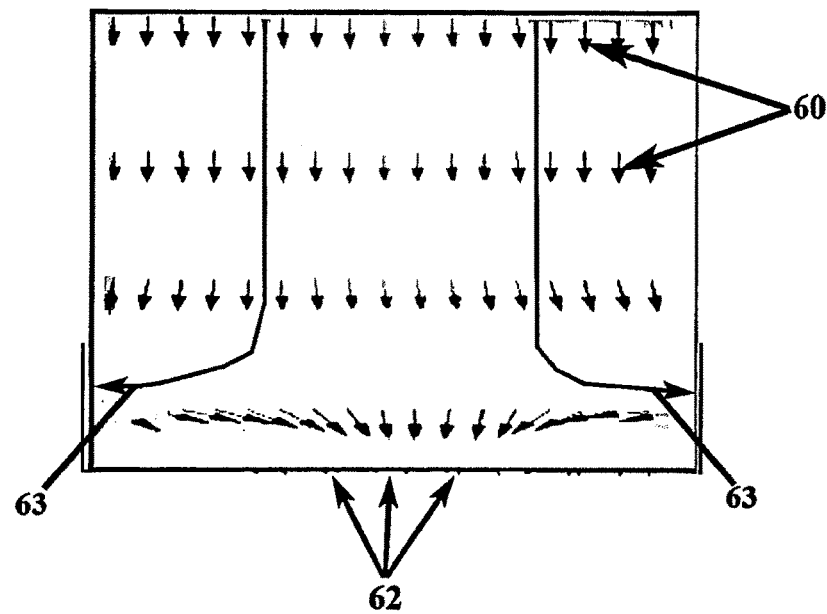
FIG. 13 depicts a force diagram of the resultant electrodes of FIG. 12 showing the direction of the dielectrophoretic force acting on bacteria.

At a matching frequency, the Re{CM(ω)} in the medium surrounding the species is positive, which results in a positive dielectrophoretic force directed towards a capturing electrode. The set of electrodes and their geometry in the microchannel cross-section is shown in FIG. 12 for capturing and immobilizing bacteria. The direction of the dielectrophoretic force acting on bacteria is shown in the force diagram of FIG. 13. Arrows 60 show the direction of the dielectrophoretic force on bacteria, causing the bacteria to collect on the electrodes. Despite the flow directed towards the microchannel outlet 63, bacteria are collected on the collecting electrodes 62 due to a positive dielectrophoretic force and a positive Re{CM(ω)} factor.

Figure 14:
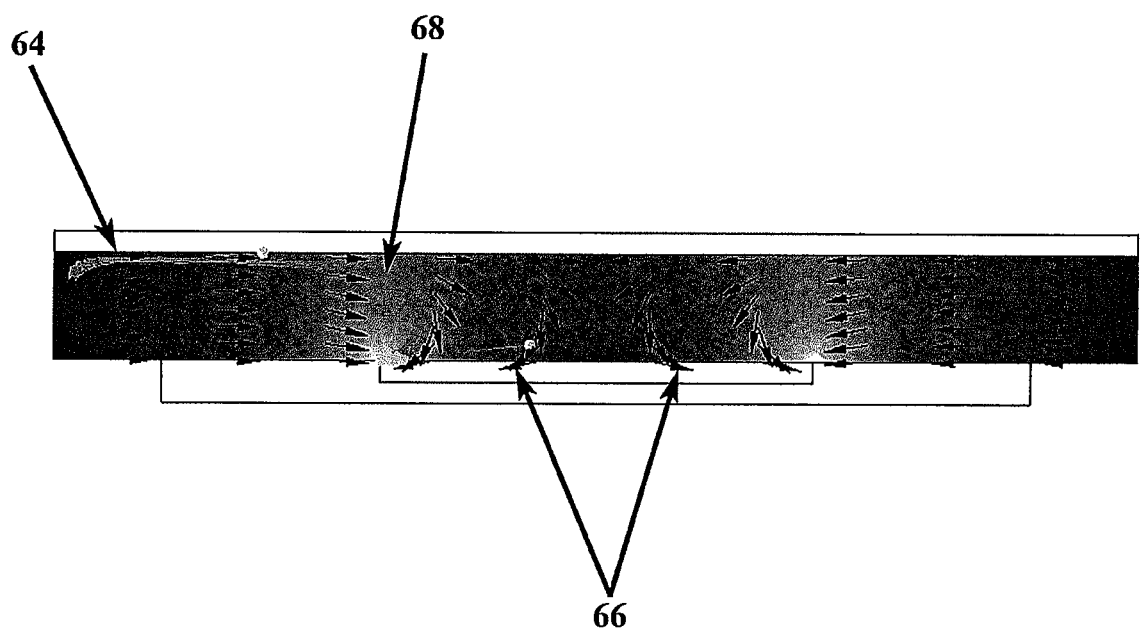
FIG. 14 depicts a flow velocity profile with inflow from left and the dielectrophoresis force directing/pushing bacteria to the sensor at the bottom of a microfluidic channel (overcoming diffusion limitations)

FIG. 14 depicts a flow velocity profile 64 with inflow from the left and the dielectrophoresis force directing/pushing bacteria to the sensor at the bottom of a microfluidic channel (overcoming diffusion limitations). Arrows show direction of the dielectrophoretic force acting on bacteria 68. Despite the flow directed towards the microchannel outlet, bacteria are collected on the collecting electrode due to a positive dielectrophoretic force and a positive Re{CM(ω)} factor. When the surrounding medium is changed by the buffer solution, the value of the Re{CM(ω)} factor becomes negative, and the dielectrophoretic force repels bacteria from the electrode causing species release.

To enhance separation, overcome the limitation caused by high ionic strength of the solution, and obtain functional analyte (bacteria) response, the initial medium (e.g., blood serum) is diluted and partially replaced by the buffer solution. As a result, the dielectric constant of the medium $\in_m$ changes and the Re{CM(ω)} factor changes resulting in a change of the magnitude and potentially direction of the force.

The change of the Re{CM(ω)} factor upon the change of the particle/cell/bacteria permittivity ($\in_p$) is used to obtain a differential functional response.

This form of α-screen testing allows for a portable platform for rapid multiplexed analyte detection, such as bacteria, from blood samples of ill patients at a point-of-care application. Doctors would be able to diagnose the bacteria of infection, and accurately prescribe only the necessary antibiotic, resulting in a more efficient disease treatment, and limiting antibiotic-resistance formation.

Using the apparatus of the present invention, this α-screen testing does not require additional laboratory space, and is low in energy consumption. It may be used with a sensor network integrated with food processing lines in food processing plants for continuous food product quality monitoring, or used in food storage and transport. It may be integrated in a hand-held unit for rapid *Vibrio cholera* and *E. coli* bacteria detection from water samples to determine water safety.

By introducing to the medium a reference solution, such as a buffer, and additional pharmaceuticals, the dielectric constant of the medium $\in_m$ changes, the dielectric constants of the particles/bacteria/cells $\in_p$ change, and $\text{Re}\{CM(\omega)\}$ change for different species, resulting in a change in $F_{DEP}$ allowing to distinguish between the analyte components.

Using the previous values as an illustrative example, the $\alpha$ coefficient for *E. coli* and *Micrococcus* is negative and has a different magnitude in blood serum at 10 MHz (*E. coli* $\alpha=-0.0044$ $(10^{-24})$ $J(m/V)^2$, *Micrococcus* $\alpha=-0.0027$ $(10^{-24})$ $J(m/V)^2$), while a is positive in a PBS buffer solution at 10 MHz (*E. coli* $\alpha=0.0055$ $(10^{-24})$ $J(m/V)^2$, *Micrococcus* $\alpha=0.0106$ $(10^{-24})$ $J(m/V)^2$). The force $F_{DEP}$ on *Micrococcus* in serum will have a lower magnitude than on *E. coli*; however, in a buffer solution (such as PBS) the force on *Micrococcus* will be stronger than on *E. coli*. Introducing a pharmaceutical or a substance (antibiotic) which pierces only the membrane of alive *Micrococcus* at 10 MHz in PBS, but not the membrane of *E. coli* or dead *Micrococcus* in buffer will allow differentiating alive from dead *Micrococcus* and *E. coli*, since the dielectrophoretic force depends on the size of the particle/bacteria/cell, where $F_{DEP}$ is proportional to $r^3$.

Thus, a tuned chemical modification of the medium allows differentiating and fingerprinting different species. A sequence of modules with tuned chemical modifications will allow species selection.

In the preferred embodiment, the invention applies an electrical waveform and a dielectrophoretic force for enclosing the separated bacteria in a small volume around a sensor to significantly decrease diffusion time to the sensor. Bacteria trapping on a nanowire or nanoribbon sensor is a resultant of the dielectrophoretic trapping mechanism and surface modification of the sensor for capture. In this manner, a dielectrophoretic force is used as a confining force for trapping micro-sized blood components (RBC, WBC, bacteria, and the like).

The DEP capture mechanism for bacteria decreases the volume of diffusion of a product of interest (particle, bacteria, and/or cell) in the sensor chamber, and decreases the time for the product of interest to diffuse towards the sensor surface, which is necessary for detection.

The electronic device that implements this separation may be miniaturized to an integrated circuit, and does not require trained personnel—the user only introduces a sample (such as blood or water) into the inlet chamber, and an automated process performs sampling, separation, condensation, transport, and detection. Using dielectrophoresis, the device automatically separates any present bacteria from the rest of the sample—for example, with blood, the large blood components (e.g., red and white blood cells). The separated bacteria are concentrated by a second dielectrophoretic region, and finally detected using label-free nanosensors which may be functionalized with bacteria specific antibodies for selectivity.

Figures 15A, 15B:
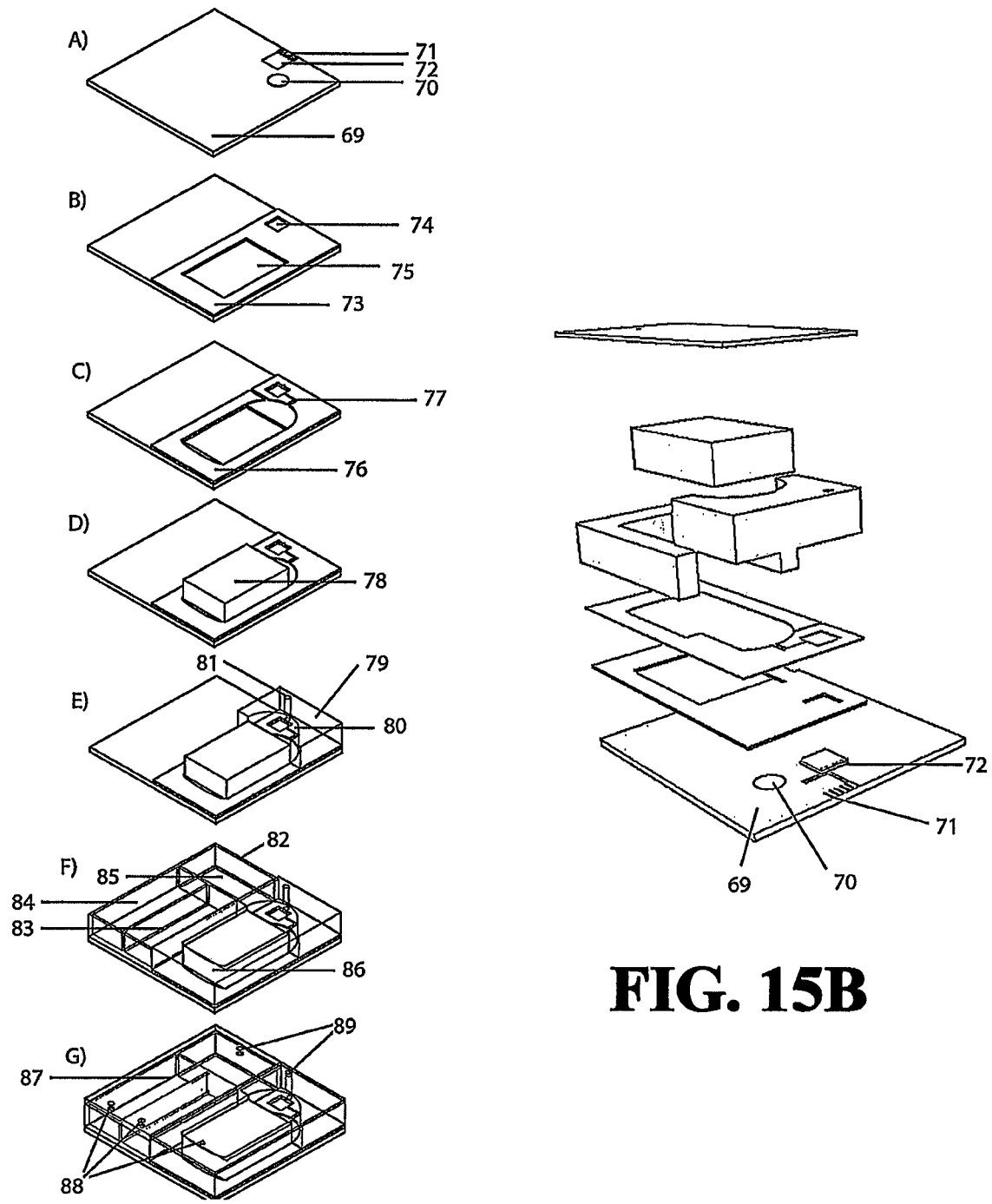
FIG. 15A depicts fabrication levels or steps of integration of the present invention on an integrated circuit chip.
FIG. 15B depicts an expanded assembly drawing of the layers representing the fabrication steps of FIG. 15A.

The levels of integration of the present invention on an integrated circuit chip are generally depicted by the fabrication steps of FIG. 15A. Step A depicts a printed circuit board with an integrated circuit 69, embedded electrode connections 70, 71 and an embedded sensor 72. The subsequent layers and components depicted in Steps B-G are stacked consecutively and thermally and/or chemically bonded to form the device.

Step B of FIG. 15A provides a structure provided in an insulator layer 73 bonded on top (or bottom) of the PCB. The opening 74 is for the sensor chamber, providing access to the sensor and embedding electric connections. The opening 75 is for alignment of the microfluidic separator.

Step C adds insulator layer 76 with openings for the separator, the condenser chamber, and a microfluidic channel connecting chambers, e.g. the condenser with the sensor chamber 77.

Step D depicts the addition of the microfluidic separator module 78.

Step E adds an insulator layer forming the walls of the condenser 79, an electrode 80, and outlet 81 from the sensor chamber.

Step F adds insulator layer 82 forming the walls of the test sample chamber 83, buffer/reference liquid chamber 84, waste chamber 85, and the insulator layer 86 forming the walls of the separator.

Step G adds lid 87 with inlets to the chambers for sample, liquid storing, inlets 88 to the separator, and outlet 89 from the sensor chamber and waste chamber.

FIG. 15B depicts an expanded assembly drawing of the layers representing the fabrication steps of FIG. 15A.

Figure 16:
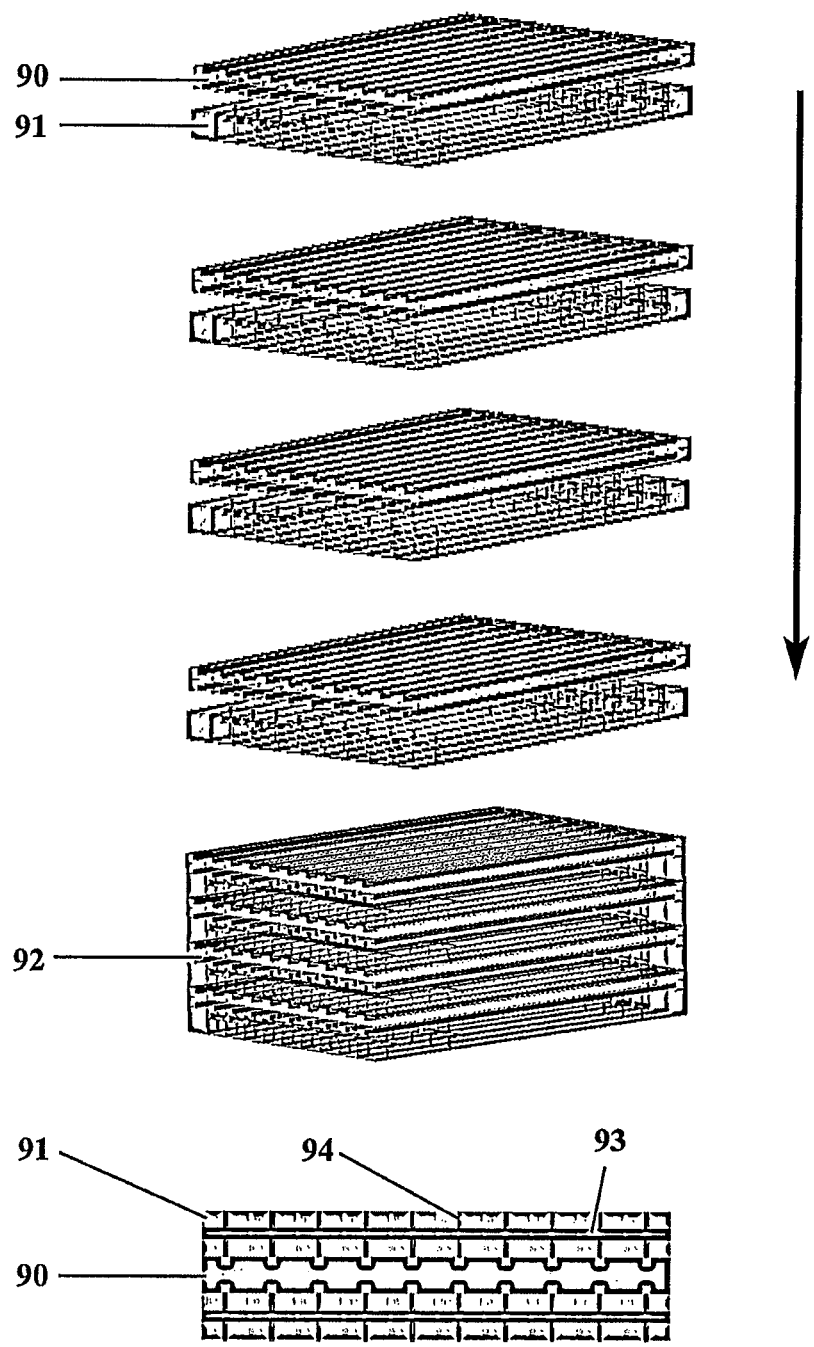
FIG. 16 is an expanded assembly drawing of the layers of a microfluidic separator.

FIG. 16 is an expanded assembly drawing of the layers of a microfluidic separator. The layers include a first layer 90 having microchannel structures and coated with a planar electrode, followed by a second layer 91 having discrete waste electrodes. These layers are stacked in pairs to form a microfluidic separator module 92. The interconnected waste collecting microchannels 93, 94 are located inside of the insulating layers. The described assembly provides customizing the number of microchannels on each layer, the number of stacked layers, and the device throughput.

Figure 17:
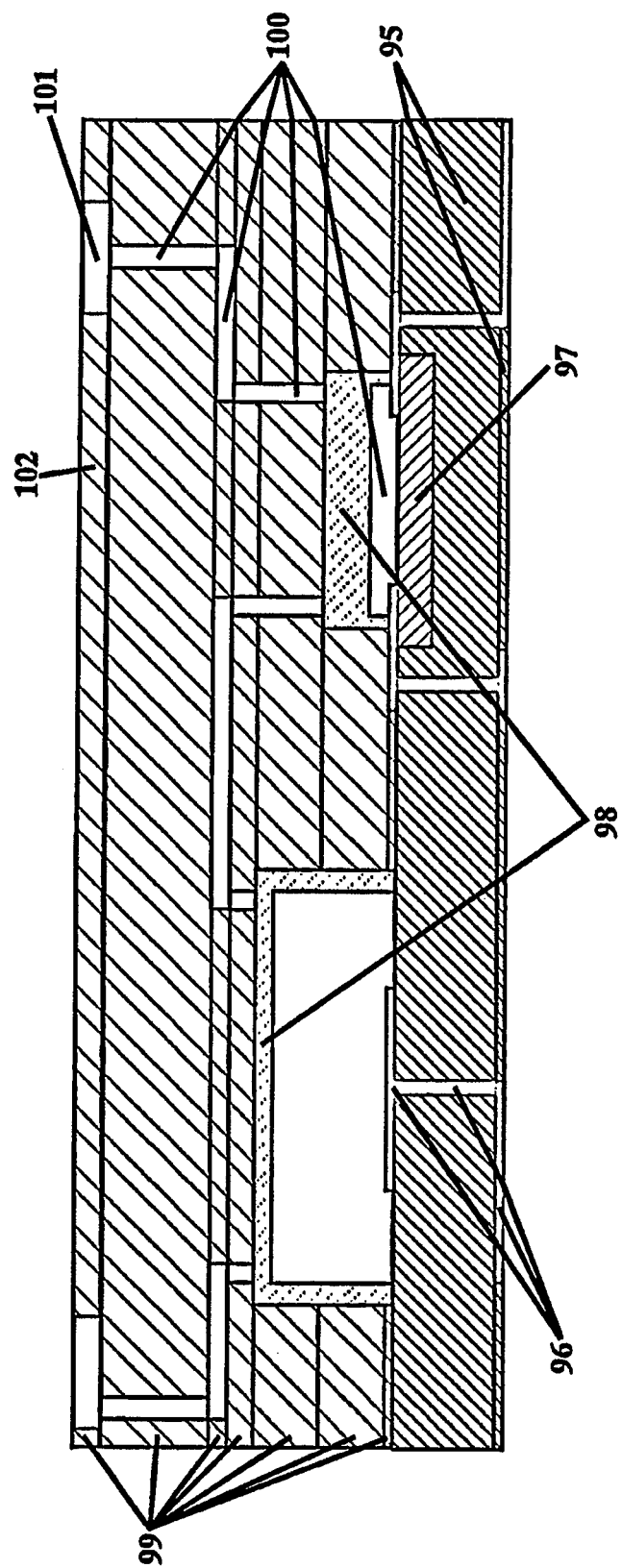
FIG. 17 depicts electrical connections and microfluidic connections between components provided in embedded layers of an integrated circuit device of the present invention.

In one embodiment the electrical connections and microfluidic connections between components are provided in embedded layers as shown in FIG. 17.

FIG. 17 shows a printed circuit board 95 with embedded copper connections 96. An integrated circuit sensor 97 is connected by wire-bonding, BGA, or flip-chip technology to the PCB. A microfluidic channel or chamber 98 is embedded in layers of insulator 99 with openings cut to fit the microfluidic structures 98. The layers of insulator 99 are stacked and thermally or chemically bonded. The openings and holes 100 in the layers of the insulator 99 align vertically and form microchannels for fluid transport. The inlets and outlets 101 to the integrated electronic microfluidic circuit are defined in the top insulator layer 102.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A device for capture, detection, quantification, and/or identification of an analyte, the device comprising at least one unit having integrated components, comprising:

a microfluidic separator for trapping biological material to be analyzed and/or separated, the microfluidic separator comprising a plurality of plates patterned with a first set of electrodes on at least one side and a plurality of internal channel structures having a second set of electrodes patterned on at least one internal surface of the internal channel structures, wherein each of said plurality of internal channel structures is sandwiched between two of said plurality of plates which together form an array of microfluidic channels, the microfluidic separator further comprising an insulator layer forming a wall of the microfluidic separator, and a microfluidic sensor for sensing and/or analyzing the biological material trapped and/or separated by said microfluidic separator, the microfluidic sensor comprising at least one sensing electrode and a secondary microfluidic channel; and a waste chamber for collecting waste separated from the biological material and into the microfluidic waste channel via the microfluidic separator.

2. The device of claim 1 further including a condenser having a collecting electrode for localizing and/or capturing the biological material trapped and/or separated by said microfluidic separator to be sensed and/or analyzed by the microfluidic sensor.

3. The device of claim 1 wherein the first and second sets of electrodes of the microfluidic separator are coated with an insulator layer.

4. The device of claim 1 wherein the analyte to be identified is a bacteria, pathogen, or other particle.

5. The device of claim 1 wherein the first and second sets of electrodes of the microfluidic separator are arranged in any two-dimensional pattern, including an arced, circular, oval, or array pattern.

6. The device of claim 1 wherein the secondary microfluidic channel has an inlet and an outlet.

7. The device of claim 1 wherein the at least one sensing electrode of the microfluidic sensor has a width between about 1 μm and 100 μm.

8. The device of claim 1 wherein each of the first and second sets of electrodes of the microfluidic separator has a width between about 1 μm and 100 μm.

9. The device of claim 1 wherein the first and second sets of electrodes of the microfluidic separator have about the same width and are separated from one another by a distance as wide as the width of each of the first and second sets of electrodes or by a distance that is less or more than the width of each of the first and second sets of electrodes.

10. The device of claim 1 further including a first injection chamber configured to store a biological material, and a second injection chamber configured to store a reference solution.

11. The device of claim 1 wherein the primary microfluidic channel length, L, is about one centimeter.

12. A device for capture of an analyte, the device comprising at least one unit having integrated components, comprising:

a first injection chamber configured to store a biological material;

a second injection chamber configured to store a reference solution;

a microfluidic separator comprising a plurality of plates patterned with a first set of electrodes on at least one side and a plurality of internal channel structures having a second set of electrodes patterned on at least one internal surface of the internal channel structures, wherein each of said plurality of internal channel structures is sandwiched between two of said plurality of plates which together form an array of microfluidic channels, the microfluidic separator further comprising an insulator layer forming a wall of the microfluidic separator, and a condenser having a collecting electrode for localizing and/or capturing the biological material trapped and/or separated by said microfluidic separator;

a microfluidic sensor for sensing and/or analyzing the biological material trapped and/or separated by said microfluidic separator and localized and/or captured by the collecting electrode, the microfluidic sensor comprising at least one sensing electrode; and a waste chamber for collecting waste separated from the biological material and into the microfluidic waste channel via the microfluidic separator.

13. The device of claim 12 wherein the microfluidic separator, the condenser, the microfluidic sensor, and the waste chamber are all integrated on a semiconductor chipset.

14. The device of claim 12 wherein the microfluidic sensor further comprises a secondary microfluidic channel with an inlet and an outlet.

15. The device of claim 12 wherein the first and second sets of electrodes the microfluidic separator are coated with an insulator layer.

16. The device of claim 13 wherein the analyte to be identified is a bacteria, pathogen, or other particle.

* * * * *